US012664570B1

(12) United States Patent
Bouyarmane et al.

(10) Patent No.: US 12,664,570 B1
(45) Date of Patent: Jun. 23, 2026

(54) AUTOMATED ITEM LISTING GENERATION SYSTEM

(71) Applicant: Amazon Technologies, Inc., Seattle, WA (US)

(72) Inventors: Karim Bouyarmane, Seattle, WA (US); Amirhossein Tavanaei, Newcastle, WA (US); Kee Kiat Koo, Shoreline, WA (US); Hayreddin Ceker, Fall City, WA (US); Yingjie Li, Bellevue, WA (US); Nicholas Hespe, New York, NY (US); Shaobai Jiang, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 18/618,924

(22) Filed: Mar. 27, 2024

(51) Int. Cl.
*G06Q 30/0601* (2023.01)
*G06F 40/20* (2020.01)
*G06N 20/10* (2019.01)

(52) U.S. Cl.
CPC ......... *G06Q 30/0601* (2013.01); *G06F 40/20* (2020.01); *G06N 20/10* (2019.01)

(58) Field of Classification Search
None
See application file for complete search history.

(56) References Cited

U.S. PATENT DOCUMENTS

| | | | | |
|---|---|---|---|---|
| 7,996,440 | B2 * | 8/2011 | Probst | G06F 40/20 |
| | | | | 704/275 |
| 8,954,389 | B2 * | 2/2015 | Yin | G06F 11/3684 |
| | | | | 707/705 |
| 11,341,354 | B1 * | 5/2022 | Ko | G06N 3/08 |
| 11,395,022 | B1 * | 7/2022 | Chachare | H04N 21/251 |
| 12,124,939 | B1 * | 10/2024 | Tantiongloc | G06N 3/063 |
| 2007/0043730 | A1 * | 2/2007 | Wisely | G06F 16/9538 |
| 2007/0282892 | A1 * | 12/2007 | Probst | G06F 40/258 |
| | | | | 707/999.102 |
| 2009/0106127 | A1 * | 4/2009 | Purdy | H04N 1/00453 |
| | | | | 705/26.1 |
| 2014/0156630 | A1 * | 6/2014 | Yin | G06F 16/211 |
| | | | | 707/710 |
| 2016/0026720 | A1 * | 1/2016 | Lehrer | G06F 16/23 |
| | | | | 707/710 |

(Continued)

OTHER PUBLICATIONS

Unal, A.B., et al., "ESCAPED: Efficient Secure and Private Dot Product Framework for Kernel-based Machine Learning Algorithms with Applications in Healthcare," arXiv:2012.02688v1 [cs. LG] Dec. 4, 2020. (Year: 2020).*

(Continued)

*Primary Examiner* — Nicholas D Rosen
(74) *Attorney, Agent, or Firm* — KNOBBE, MARTENS, OLSON & BEAR, LLP

(57) ABSTRACT

A system may receive a request to generate an item listing for an item. The system may retrieve a content seed comprising item information associated with the item, and generate the item listing based in part on providing the content seed as input to a machine learning model to generate an internally consistent item listing in a single pass, such that the item listing is formatted according to an object format associated with a content platform. The system may store the item listing in a database associated with a commerce platform.

20 Claims, 13 Drawing Sheets

(56)     References Cited

U.S. PATENT DOCUMENTS

| | | | | |
|---|---|---|---|---|
| 2017/0083676 A1* | 3/2017 | Sigler | .................... | G16H 40/20 |
| 2017/0193592 A1* | 7/2017 | Avidan | ................. | G06Q 10/087 |
| 2018/0047387 A1* | 2/2018 | Nir | .......................... | G10L 15/02 |
| 2018/0239615 A1* | 8/2018 | Ravid | ................. | G06F 16/1794 |
| 2023/0215448 A1* | 7/2023 | Malenovsky | .......... | G10L 25/90 |
| | | | | 704/231 |
| 2023/0385887 A1* | 11/2023 | Fuchs | ................... | G06F 40/174 |
| 2023/0418815 A1* | 12/2023 | Zorn | ........................ | G06F 8/10 |
| 2024/0062268 A1* | 2/2024 | Zhang | ..................... | G06N 3/08 |
| 2024/0087146 A1* | 3/2024 | Rodrigues | ............. | G06N 20/00 |
| 2025/0054044 A1* | 2/2025 | Scaff | .................... | G06F 3/0482 |
| 2025/0165612 A1* | 5/2025 | Kling | ................... | G06F 21/577 |

OTHER PUBLICATIONS

Anonymous, "Automate your Amazon listing optimization," Perci, retrieved online: https://web.archive.org/web/20230603165636/https:/perci.ai/, accessed on Oct. 1, 2024, in 11 pages.

Anonymous, "Schema Conversion," AWS, retrieved online: https://aws.amazon.com/dms/schema-conversion-tool/, accessed on Oct. 1, 2024, in 7 pages.

* cited by examiner

300

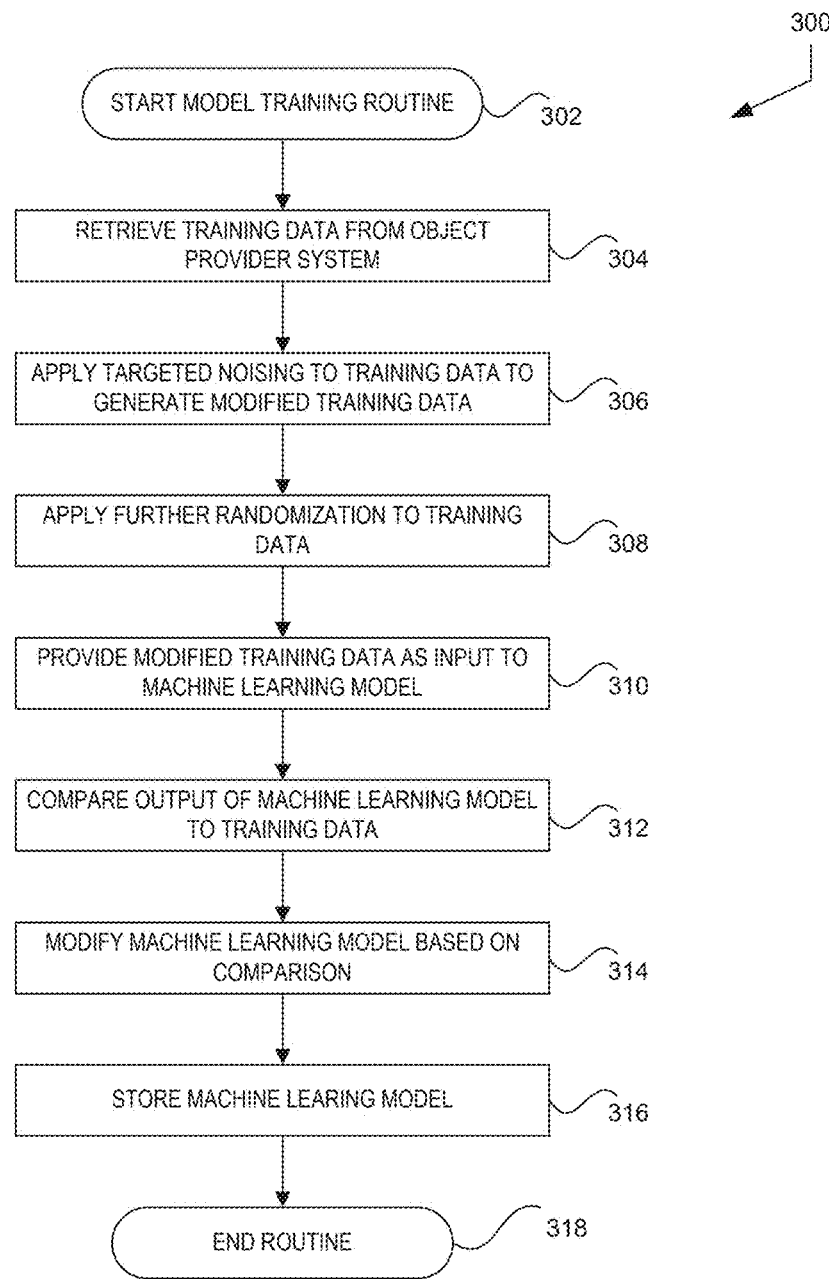

START MODEL TRAINING ROUTINE ⟶ 302

RETRIEVE TRAINING DATA FROM OBJECT PROVIDER SYSTEM ⟶ 304

APPLY TARGETED NOISING TO TRAINING DATA TO GENERATE MODIFIED TRAINING DATA ⟶ 306

APPLY FURTHER RANDOMIZATION TO TRAINING DATA ⟶ 308

PROVIDE MODIFIED TRAINING DATA AS INPUT TO MACHINE LEARNING MODEL ⟶ 310

COMPARE OUTPUT OF MACHINE LEARNING MODEL TO TRAINING DATA ⟶ 312

MODIFY MACHINE LEARNING MODEL BASED ON COMPARISON ⟶ 314

STORE MACHINE LEARING MODEL ⟶ 316

END ROUTINE ⟶ 318

START OBJECT REGENERATION ROUTINE ⟶ 402

RETRIEVE INFORMATION TO BE REGENERATED ⟶ 404

DETERMINE TARGET OBJECT FORMAT ⟶ 406

PROVIDE OBJECT TO BE REGENERATED AND TARGET OBJECT STRUCTURE AS INPUT TO MACHINE LEARNING MODEL ⟶ 408

RECEIVE REGENERATED OBJECT FROM MACHINE LEARNING MODEL ⟶ 410

TRANSMIT REGENERATED OBJECT ⟶ 412

END ROUTINE ⟶ 414

500

START OBJECT GENERATION ROUTINE — 502

IDENTIFY INFORMATION SOURCE FOR OBJECT GENERATION — 504

RETRIEVE INFORMATION FOR OBJECT GENERATION — 506

508

IS ADDITIONAL OBJECT INFORMATION AVAILABLE FROM ANOTHER SOURCE?

YES

NO

PROVIDE RETRIEVED INFORMATION TO MACHINE LEARNING MODEL — 510

RECEIVE GENERATED OBJECT — 512

TRANSMIT GENERATED OBJECT — 514

END ROUTINE — 516

700

710

| ATTRIBUTE | VALUE |
|---|---|
| SCREEN DIAGONAL | 42" |
| HORIZONTAL RESOLUTION | 1920 px |
| VERTICAL RESOLUTION | 1080 px |
| SCREEN TYPE | 250 nits LCD |

OBJECT GENERATION
730

720

| ATTRIBUTE | VALUE |
|---|---|
| SCREEN SIZE | 42" |
| SCREEN RESOLUTION | 1920x1080 |
| ILLUMINATION | 250 nits |
| SCREEN PANEL TYPE | LCD |

800

| ATTRIBUTE | VALUE |
|---|---|
| INTERNAL VOLUME | 9 L |
| COLOR | YELLOW |
| DEPARTMENT | CHILDREN - GIRLS |
| FRONT POUCH | YES |
| SIDE POUCH | YES |

820

OBJECT GENERATION 830

810

BACKPACK FOR GIRLS

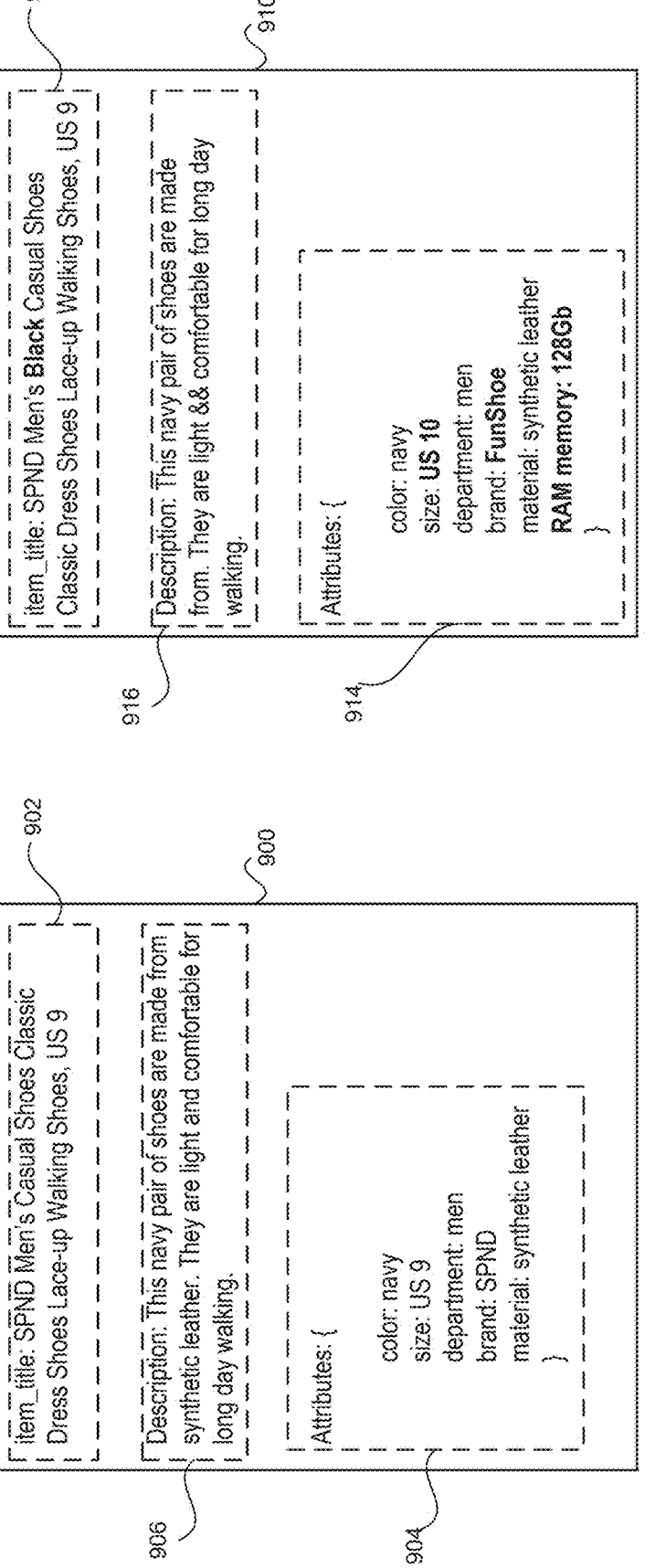

item_title: SPND Men's Black Casual Shoes Classic Dress Shoes Lace-up Walking Shoes, US 9

Description: This navy pair of shoes are made from. They are light && comfortable for long day walking.

Attributes: {
   color: navy
   size: US 10
   department: men
   brand: FunShoe
   material: synthetic leather
   RAM memory: 128Gb
   } item_title: SPND Men's Casual Shoes Classic Dress Shoes Lace-up Walking Shoes, US 9

Description: This navy pair of shoes are made from synthetic leather. They are light and comfortable for long day walking.

Attributes: {
   color: navy
   size: US 9
   department: men
   brand: SPND
   material: synthetic leather
   }

*Fig. 9*

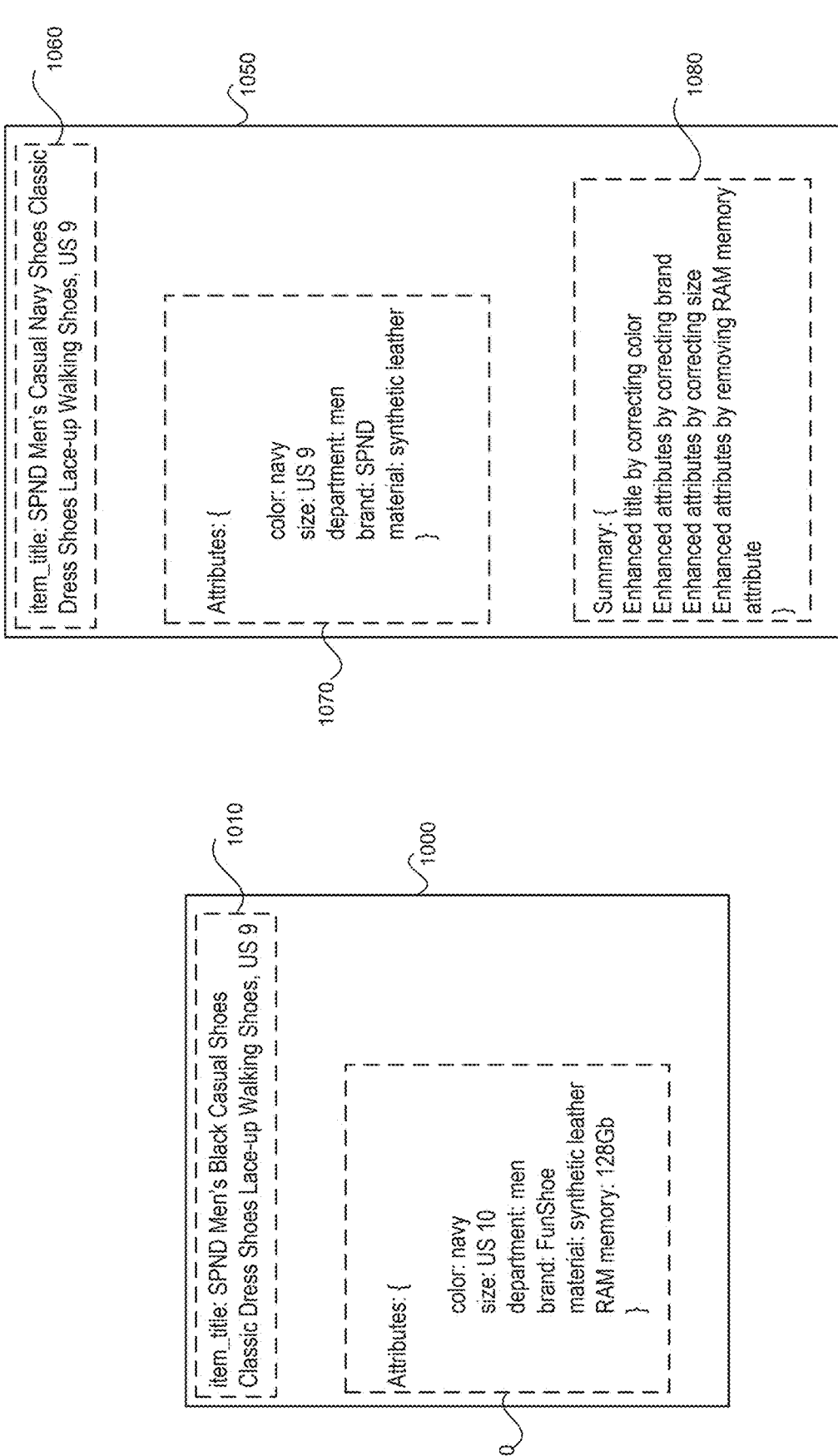

1060

1050 item_title: SPND Men's Casual Navy Shoes Classic
Dress Shoes Lace-up Walking Shoes, US 9

1070

Attributes: {
    color: navy
    size: US 9
    department: men
    brand: SPND
    material: synthetic leather
}

1080

Summary: {
Enhanced title by correcting color
Enhanced attributes by correcting brand
Enhanced attributes by correcting size
Enhanced attributes by removing RAM memory
attribute
}

1010

1000 item_title: SPND Men's Black Casual Shoes
Classic Dress Shoes Lace-up Walking Shoes, US 9

1020

Attributes: {
    color: navy
    size: US 10
    department: men
    brand: FunShoe
    material: synthetic leather
    RAM memory: 128Gb
}

*Fig. 10*

AUTOMATED ITEM LISTING GENERATION SYSTEM

BACKGROUND

Computing systems can be used to generate structured data objects. The generated structured objects may be used for various purposes, and may have an object format based on the use of the structured object. For example, structured objects stored in a database may have a structure defined by a database schema.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 3 is a flow diagram of an illustrative routine for training an object generation model according to some embodiments.

FIG. 9 is an illustrative example of generating noisy training data for use in training an object generation machine learning model according to some embodiments.

FIG. 10 is an illustrative example of a user interface for assessing the generation of an object using an object generation machine learning model according to some embodiments.

DETAILED DESCRIPTION

Figure 1:
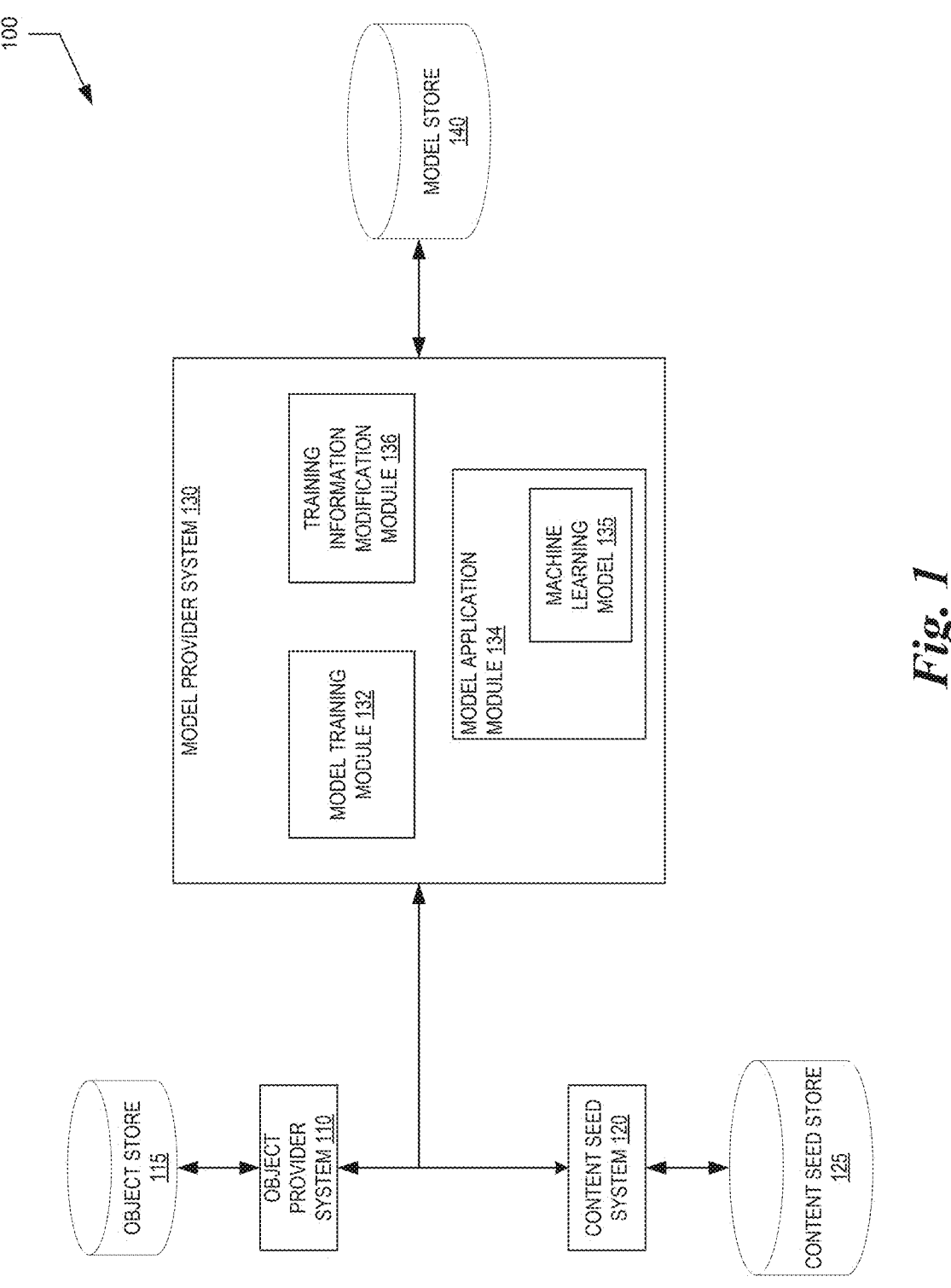
FIG. 1 is a block diagram of an illustrative data flows within an environment for training a machine learning model to provide object generation according to some embodiments.

The present disclosure relates to the training and use of a machine learning model, or ensemble of machine learning models, for generation and regeneration of data objects in a single pass based on existing structured information and/or unstructured information.

Some systems allow for the automated generation of an object according to an object format. Automated object generation may be performed according to a rules-based approach, where a set of rules is applied to input information in order to restructure the input information according to the object format. Such rules-based systems may be limited to the types of input information which may be used to generate the object. For example, the input information may be required to be in a specific format before being provided to the rules-based system, such that the rules are applicable to the input information. Further, information used by a rules-based system for object generation may not always be available. In such cases, incomplete objects may be generated, or the rules-based system may fail to generate any object. Additionally, rules-based systems may generate portions of an object separately. For example, where the object to be generated is an item listing for an ecommerce platform, a rules-based system may generate a title for the item listing according to a first set of rules, and a set of attributes for the item listing according to a second set of rules. The title and the set of attributes may be generated substantially simultaneously, however because each portion of the item listing was generated separately the title and the set of attributes may be inconsistent with each other. Such inconsistencies may lead to the generated object being of a poor quality, or otherwise undesirable for use. While reference may be made throughout the present disclosure to an item or an item listing, it should be understood that an item may refer to, for example, a product, a service, or an agreement.

Additional systems may perform consistency checks between the portions of the object generated by the rules-based system. However, such consistency checks may be time-consuming and involve additional computational resources. Further, where a consistency check results in a determination that portions of a generated object are inconsistent, additional issues arise. Where a first portion of an object and a second portion of an object each indicate a different value for a same element (e.g., a color associated with a physical object), and no other element indicates a value for the same element, the rules-based system may be unable to resolve the inconsistency. In such a case, additional information may be requested as input, manual review may be necessary, an incomplete object may be produced (e.g., by removing the inconsistent information from each portion of the object), or a low quality object may be provided by the rules-based system. Even if the rules-based system is provided with additional information or user input, there is no guarantee that an internally consistent object will be generated. Further, even in the case where a greater number of portions of objects agree on a first element value and a lesser number of portions of objects agree on a second element value, this may not indicate that the first element value is correct. Therefore, additional information, user input, or other changes may be needed to generate an internally consistent object. It should be understood that a value, as referred to herein, may be at least a portion of an image, textual information, numeric information, a sub-object, a 3D point cloud, a 3D model, a multi-dimensional numeric array, a nested structure comprising text and/or numeric values, symbolic values, and the like.

Some alternative systems allow for the automated generation of an object according to an object format using one or more machine learning models. Such alternative systems may offer additional flexibility over rules-based systems. For example, alternative systems using machine learning may allow for a wider range of input information formats, and may be configured to accept input information having no structure. However, such existing machine learning-based systems may be limited in various ways. For example, existing machine learning-based systems may be configured to generate an object based on a single type of input information, such as images, text, videos, and the like. In another example, existing machine learning-based systems may be configured to generate objects in a particular object format and may not be useful for generating objects in a second object format. Additionally, as with the rules-based approach discussed previously herein, where limited information is available as input information, such machine learning-based systems may be unable to generate a complete object.

Additionally, existing machine learning-based systems may generate a portion of the object individually, followed by a next portion, until the entire object has been generated. This presents various problems. First, where a first portion of the object is generated before a second portion of the object, existing machine learning-based systems may use the first portion as an input to generate the second portion. In using the first portion as input to generate the second portion, errors which exist in the first portion may then be propagated to any additional portions of the object generated after the first portion. Further, as discussed previously with respect to rules-based systems, existing machine learning-based systems may fail to generate internally consistent objects. For example, a first portion of an object and a second portion of an object may each be generated independently, avoiding the issue of propagating errors through subsequent object portions. However, as a machine learning model, or portion of a machine learning model, generating a second portion of an object may have no knowledge of a first portion of the object also generated by a machine learning model, the machine learning model is unable to ensure internal consistency in the generated object. Instead, further systems may be required to verify the object as internally consistent, or otherwise risk an inconsistent object being used. Then, as described above, the machine learning model may request additional information and/or manual input to resolve the inconsistency. However, even with additional information and/or manual input, a machine learning model may continue to generate inconsistent objects. Further, attempts to correct inconsistent information within an object may lead to looping behavior, where a first portion and a second portion of an object are each updated based on the other portion, repeatedly introducing the inconsistency by updating a portion of the object based on a previously inconsistent portion of the object. In such a loop, which may be referred to as a dependency loop, inconsistent information is maintained indefinitely without the intervention of another system or a human.

Further, the use of existing machine learning model-based systems does not resolve the issue of determining a correct element value when two or more portions of an object disagree on the element value. As noted above, a majority-wins approach, where the element value which occurs in the greatest number of portions of the object is determined to be correct, does not necessarily provide a correct element value. As such, human intervention or further processing may be used to determine the correct element value, resulting in an inefficient process for automated object generation.

Additionally, existing object stores may include objects which do not conform to an object format, or which are not internally consistent. Existing systems may require a user to provide an object format to the system in order to determine a correct object format for the object store. Such systems may then process each portion of each existing object to ensure that the portion conforms to the object format. The system may then identify missing object portions, which are indicated as part of the object format but not present in the existing object. Existing systems may not be able to determine the information for the missing object portion without further input from a user. Further, when attempting to correct for a lack of internal consistency, existing systems may enter a dependency loop as described above.

Some aspects of the present disclosure address some or all of the issues noted above, among others, by providing a machine learning-based object generation system. The system may generate objects in a single pass, where an entire object is generated by a machine learning model in a single operation (e.g., from a single input or set of inputs provided to or obtained by the system and processed by a model in one "forward pass" or other unit of model execution, without splitting the input among different models and/or different units of model execution and without retaining a previous input). Further, the machine learning model may be configured to accept a plurality of input modalities (e.g., text, video, image, multimedia, etc.) to be used as input information to generate an object.

Advantageously, machine learning models provided herein may be trained to generate objects based on multiple input formats and input modalities. Training a machine learning model, as used to herein, may refer to domain adaptation, adaptation, fine tuning, prompt engineering, or end to end training of the machine learning model. For example, a system described herein may be configured to generate objects based on input information in various different input modalities, for example structured information (e.g., tables, graphs, objects, etc.), unstructured information (e.g., natural language descriptions, word clouds, user reviews, etc.), images, text, video, multimedia, and the like, provided as input to the machine learning model before object generation begins. The system may then use the input information having different input modalities as input to a multimodal machine learning model trained to generate an object according to an object format. In some embodiments, the machine learning model may be trained to generate objects according to an object schema or other object format, where the values of portions of the object are based on input information. Further, where input information does not provide a value for all portions of the object which are part of the object format, the machine learning model may use latent knowledge included as part of the machine learning model based on the information on which the machine learning model was trained to generate values for the portions of the object which do not have a value in the input information.

Alternatively, the machine learning model may be trained to generate objects based according to an object format provided as input in a zero-shot configuration. In some embodiments, the object format may be provided explicitly as input to the machine learning model. For example, the input to the machine learning model may include a schema for a database record, a format for an item listing, and the like. In alternative embodiments, one or more example objects which conform to the object format may be provided to the machine learning model as input. The machine learning model may then determine the object format for the generated object based on the one or more example objects.

Additionally, a machine learning model of the present system may generate an entire object in a single pass. For example, where an object format indicates that a generated object will include at least a first portion and a second portion, each of the first portion and the second portion may be generated in the same pass of the machine learning model. Generation of the first portion and the second portion may include ensuring that one or more values of elements common to the first portion and the second portion are consistent between the first portion and the second portion of the generated object. Further, as the first portion and the second portion are generated in the same pass of the machine learning model, such a machine learning model is not susceptible to the dependency loops described above. In generating the first portion and the second portion, any inconsistency of a value common to the first portion and the second portion is avoided during the generation step, and so no verification is required, thereby preventing a dependency loop from being initiated by the system. Advantageously, this may result in a reduction in the computation necessary to generate an internally consistent object.

Additional aspects of the present disclosure relate to a system for automated improvement and regeneration of existing objects in an object store. As described previously herein, object stores may contain objects which do not conform to an object format of the object store. For example, some objects may predate a current object format, be based on incomplete information, or have been transferred from another object store having a different object format. The system of the present disclosure may receive a request to regenerate the object store. Regenerating the object store (or individual objects stored therein) may be performed by the system by providing the object store (or a subset of objects) as input to a machine learning model. Advantageously, the machine learning model may learn the object format for the object store based on processing objects of the object store, removing the requirement in some systems to provide the object format as a separate input, or to train the machine learning model for the specific object format. Further, objects which have missing attribute values, or objects which are not internally consistent, may be regenerated in an improved form by the machine learning model. For example, the machine learning model may determine missing attribute values for one portion of an object from existing attribute values in one or more other portions of the object. In another example, the machine learning model may regenerate the object to have internally consistent values based on training of the machine learning model leading to the ability to determine which value is the most likely to be correct. For example, in an ecommerce listing having an item image, a title, and an item description stored as an object, the machine learning model may learn through training that the item image is the most likely object portion to contain the correct value for a color of the object. In this example, where the color listed in the title and/or the item description conflict with the color identified in the item image, the machine learning model may then regenerate the item listing so that the color indicated in the title and the item description is consistent with the color indicated by the item image. This may occur even where the item image indicates a first color, and the title and item listing indicate a second color, as the machine learning model, through its training, assigns a higher likelihood to the item image indicating the correct color.

Further embodiments of the present disclosure relate to the automated generation of structured content for a content provider system, for example an item listing for an ecommerce platform. A system may receive a request from a user (e.g., a seller, a user associated with the ecommerce platform, etc.) to generate an item listing for the ecommerce platform structured according to an object format used for listings stored by the ecommerce platform. The ecommerce platform may store item listings as data objects comprising a plurality of fields and an associated plurality of values. For example, an item listing may be stored as a JavaScript Object Notation (JSON) object, Extensible Markup Language (XML) object, or the like having fields for weight, price, dimension information, etc. Additionally, some item types may have different item listing formats. For example, a hat may have an item listing format used for hats or clothing, which includes fields for material type, size, and color; while a table may have a second item listing format used for furniture which includes fields for color, height, depth, and surface material. The request may indicate an information provider system (e.g., a content seed store, an object store, a data store storing an existing object in a different format, different ecommerce site, a uniform resource locator (URL), an image source, etc.) where information for generating the item listing may be obtained. The information provider system may be the requesting computing system, for example where a seller uploads images and/or text describing an item the seller plans to sell on the ecommerce platform. In some embodiments, several information provider systems may be indicated in the request, and the system may retrieve information from some or all of the indicated information provider systems. In additional embodiments, multiple item listings may be requested, and the system may retrieve information from one or more information provider systems to generate the requested item listings.

The system may use a machine learning model to generate the item listing. The machine learning model may be trained to generate item listings according to an item listing format used by the ecommerce platform. Alternatively, the machine learning model may be trained to generate structured objects generally and the item listing format may be provided as input, as previously described. The system may then apply the information retrieved from the information provider system as input to the machine learning model, and optionally information describing the format of the item listing to be generated. The machine learning model may then generate an item listing in a single pass. Advantageously, as described previously herein, generating the item listing in a single pass ensures that the generated item listing is internally consistent while avoiding dependency loops when correcting inconsistent information. The system may then provide the generated item listing to the requesting system and/or an item listing store of the ecommerce platform.

The system may further provide an interactive graphical user interface for a user, allowing the user to enter item information, provide item information provider system locations, review a generated item listing, and/or modify a generated item listing. Further, the machine learning model may include an option to provide a verbose output, which describes at least a part of the reasoning used by the machine learning model to generate the item listing.

Additional embodiments of the present disclosure relate to the generation of training data for the training of a machine learning model to generate objects. A system may retrieve training data from a training data system. The training data may include information for a plurality of objects. The plurality of objects may be structured according to an object schema or other object format upon which the machine learning model is intended to be trained. Alternatively, the plurality of objects may be structured according to a plurality of object formats where the machine learning model is being trained to generate objects in multiple object formats, or any object format provided to the machine learning model as input. In some cases, the amount of object information in the training data may not be sufficient to train the machine learning model to a desired level of performance. For example, the initial corpus of training data may primarily include data representing complete data objects. Advantageously, the system may modify the training objects of the training data to generate additional training objects. The system may generate the additional training objects by adding noise to the objects of the training data.

Where the training objects are item listings for an ecommerce platform having object portions comprising a title, text description, and image, the system may add noise to at least part of one or more of the object portions to generate training objects. For example, for a first item listing of the training data, the system may alter a color indicated by the title, and remove the image to generate a first additional training object. The system may then alter a size indicated in the text description, and remove a brand name from the title to generate a second additional training object. Advantageously, where the training data includes item listings which have no or few errors, adding noise to the item listings allows the machine leaning model to learn to regenerate the initial correct item listing from a plurality of noisy item listings. This may allow for efficient updating of the machine learning model based on feedback from comparing the regenerated item listing to the initial item listing in the training data.

As used herein, the term "object" may refer to any structured data format. For example, an object may include an item listing, a software code object, a database record, etc. Further, the term "object format" may refer to the structure of an object, including the portions of the object which make up the object. For example, an object format may include a database schema, a software class definition, an item listing format for an ecommerce platform, etc. The portions of the object may be associated with various values. For example, a database schema may define that each object (e.g., each record of the database) includes a timestamp in a first portion of the object, a data source location value in the second portion of the object, and an expiry time value in a third portion of the object. In another example, an ecommerce listing format may indicate that the object (e.g., the item listing) is to be formatted as a JSON object, and that the object is to include a department associated with the item, a color of the item, a weight of the item, and a length dimension of the item in this order. Further, some object stores may include objects in a plurality of formats. For example, an ecommerce item listing object store may use a first format for objects describing a clothing item, and a second format for objects describing a furniture item.

The term "model," as used in the present disclosure, can include any computer-based models of any type and of any level of complexity, such as any type of sequential, functional, or concurrent model. Models can further include various types of computational models, such as, for example, recursion models, graph network models, neural network models ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like.

An LLM is any type of language model that has been trained on a larger data set and has a larger number of training parameters compared to a regular language model. An LLM may understand more intricate patterns and generate text that is more contextually relevant to a received prompt due to its extensive training. An LLM may comprise a NN trained using self-supervised learning. Self-supervised learning may refer to training a model on noised information, as described herein, by attempting to denoise the noised information, and adjusting model parameters in response to the performance of the LLM in denoising the noised information. An LLM may be of any type, for example a multimodal LLM. An LLM (and/or other models of the present disclosure), may include, for example, attention-based and/or transformer architecture or functionality.

Throughout the present disclosure, single pass object generation may be referred to. As used herein, the term single pass object generation, or generating an object in a single pass, refers to generating an entire object during a single generation step (e.g., a single forward pass) or other execution unit of the machine learning model. That is, all elements, portions, and values of the object are generated by the machine learning model during a same generation step, where an output of a first generation step is not used as input for a further generation step, and additional information is not provided during the same generation step.

Various aspects of the disclosure will be described with regard to certain examples and embodiments, which are intended to illustrate but not limit the disclosure. Although aspects of some embodiments described in the disclosure will focus, for the purpose of illustration, on particular examples of object types, object formats, and the like, the examples are illustrative only and are not intended to be limiting. In some embodiments, the techniques described herein may be applied to additional or alternative types of object types, object formats, and the like. Additionally, any feature used in any embodiment described herein may be used in any combination with any other feature or in any other embodiment, without limitation.

Example Object Generation Machine Learning Model Training Environment

With reference to an illustrative example, FIG. 1 shows example environment 100 for training a machine learning model to provide object generation. The environment 100 includes an object provider system 110, a content seed system 120, and a model provider system 130.

The object provider system 110 is a computing system configured to retrieve, generate, access, and/or provide objects to the model provider system 130 to be used in training a machine learning model, and may be in communication with an object store 115. Objects provided by the object provider system 110 may be stored in the object store 115, and the objects may be stored in a particular object format. For example, the object provider system 110 may receive a request from the model provider system 130 to provide objects which are exemplary of a particular object format. The object provider system 110 may identify objects stored in one or more object stores 115 formatted according to the requested object format, and retrieve them. The object provider system 110 may then provide the objects in the requested object format to the model provider system 130. Alternatively, the object provider system 110 may receive a request for objects stored in a particular object store 115 (e.g., a database). The object provider system 110 may then provide some or all of the objects of the requested objects store 115 to the model provider system 130 for use in training a machine learning model.

The object store 115 is a storage location configured to store objects according to an object format. For example, the object store 115 may be a server configured to store one or more databases, each database containing a set of objects. In another example, the object store 115 may be a storage location associated with a business (e.g., an online retailer) storing item information, or other business information, according to an object format. The object store 115 may be accessible directly by the object provider system 110, for example the object provider system 110 may include the object store 115. In another example, the object store 115 may be accessible to the object provider system 110 via a network (e.g., network 250 described below in relation to FIG. 2). The object provider system 110 and the object store 115 may communicate using a communication protocol (e.g., an application programming interface) which allows the object provider system 110 to identify and request specific objects from the object store 115. Objects stored by the object store 115 may be stored according to a structured format (e.g., as a relational database, an ordered list, an indexed set of JSON objects, etc.). Alternatively, the object store 115 may store objects in an unstructured format (e.g., as a data lake).

The content seed system 120 is a computing system configured to provide information which may be used as input to a machine learning model, used to generate an object according to an object format. The content seed system 120 may be in communication with a content seed store 125. As used herein, a content seed may refer to structured or unstructured information provided as input to the model provider system 130 for use in generating an object. The content seed provides information which will be used to at least generate values for portions of a generated object. For example, a content seed may include an item listing, an image, text, video, audio, unstructured information to be stored in a database, values for a software code object, an existing object to be regenerated, etc. The content seed may also indicate one of a plurality of object formats to be used to generate the generated object. The indication of the object format to be used may be explicit in the content seed. Alternatively, the indication of the object format may be implicit in the content seed, and determined by a machine learning model or by the model provider system 130 during object generation. In some embodiments, the content seed system 120 may be an interactive user system (e.g., the requesting system 280) by which a user may provide the content seed (e.g., as a file upload, by entering information in an interactive graphical user interface, etc.). In such embodiments, there may be no content seed store 125, or the content seed store 125 may be the hard drive of the user's computing device from which the content seed is uploaded.

The content seed store 125 is a storage location configured to store information. For example, the content seed store 125 may be a server storing structured and/or unstructured information useful for generating objects according to an object format using a trained machine learning model of the model provider system 130. The information stored by the content seed store 125 may be used, for example, to test the performance of the model provider system 130 in generating objects according to the object format. Information stored by the content seed store 125 may be in one or more object formats, which may differ from the trained machine learning model's output object format. In some embodiments, the information stored by the content seed store 125 may not be in a defined format (e.g., as a set of parts of information associated by metadata but having no structure). Alternatively, the content seed store 125 may store objects in the same object format the trained machine learning model has been trained to produce, where the objects stored by the content seed store 125 are incomplete, corrupted, lacking information, or otherwise potentially improvable by regeneration of the object using the trained machine learning model. In some embodiments, the content seed store 125 may be a hard drive of a user system (e.g., the requesting system 280 described in further detail below in relation to FIG. 2). For example, a user may use the model provider system 130 to train a machine learning model to generate objects according to an object format. The user may then test the trained machine learning model using a content seed as input to the trained machine learning model and assessing the output of the machine learning model to determine a performance metric for the trained machine learning model.

The model provider system 130 is a computing system configured to provide for the training, storage, and use of a machine learning model configured to generate and/or regenerate objects according to an object format. The model provider system 130 may include a model training module 132, a training information modification module 136, and a model application module 134. The model provider system 130 may also be in communication with a model store 140 used to store one or more machine learning models.

The model training module 132 is configured to apply training information as input to a machine learning model, and to adjust parameters of the machine learning model based on the output generated in response to the input training information. For example, where the machine learning model is a neural network, the model training module 132 may adjust weights of connections between nodes of the neural network in response to a comparison of an output of the machine learning model to a ground truth value.

The model application module 134 is configured to retrieve a machine learning model 135 from the model store 140, for example based on information received in a request to use the model provider system 130 to generate an object. The model application module 134 is further configured to retrieve input information, for example from an object provider system 110 or a content seed system 120, which will be used to generate the object. The object provider system 110 or content seed system 120 from which the information is retrieved may be determined based at least in part on the request. The model application module 134 then applies input information (e.g., retrieved information from the content seed system 120, or information received as part of the request) to the machine learning model to generate an output. The model application module 134 then provides the output to the model provider system 130 for transmission.

The machine learning model 135 may be any type of machine learning model which may be used to generate an internally consistent, structured, object in a single pass. The machine learning model 135 may be a trained machine learning model, for example a machine learning model trained by the model training module 132 as described herein.

The training information modification module 136 is configured to generate training information in the form of a training object or other training data item, for example by applying noise to existing object information. When applying noise to generate a training object, the training information modification module 136 may in some embodiments ensure that the applied noise does not result in the generated training object having missing or incorrect information such that the machine learning model is unable to recover the missing or incorrect information. For example, where the original object from which the training object will be generated is an item listing, the item listing may have a title, a text description, and an image. Information indicating a color of the item described by the item listing may be contained in the image and in the title, but not the text description. If the training information modification module 136 were to remove the color from the image (such as by converting a color image to a grayscale image) and to change the color (e.g., from blue to yellow) in the title during the noising process, the machine learning model may not be able to recover the original color due to the lack of correct information after the noise has been applied. Therefore, the training information modification module 136 would either discard this training object, or would undo the application of noise to the title or the image such that the training object is made useful by ensuring the correct color value was recoverable. The training information modification module 136 may use a rules-based system to generate training objects. Alternatively, the training information modification module 136 may use a machine learning model configured to generate training objects to generate the training objects.

In order to perform the noising process, the training information modification module 136 may selected from among a plurality of noising functions, where each noising function provides a set of noising options the training information modification module 136 may apply to an object. Each noising function may be configured for use on an object element, object type, or object portion. For example, a set of noising functions for use in generating noisy versions of item listings may include a title noising function, an attribute list noising function, a bullet features noising function, or a description noising function. The title noising function may provide the options of adding an empty title, removing a title, removing a portion of a title, modifying a portion of a title, modifying a value, adding a value, removing a value, repeating a portion of a title, and the like. The bullet feature noising function may provide the options of adding an empty feature (e.g., an element with no associated value), removing or adding features, removing or adding values, adding redundant elements, and the like. The description noising function may provide the options of adding an empty description, removing a description or portion of the description, adding a portion to a description, adding a redundant portion of a description, rearranging words in a text description, removing element values from the description, and the like. An attribute noising function may provide the options of adding an empty attribute (e.g., an attribute element with no associated value), removing or adding attributes, modifying an attribute value, unnormalizing an attribute value, changing an attribute name, adding a redundant attribute, and the like. Additional examples of options a noising function may provide include removing or adding key values to a structured object, rearranging values within an object, or applying random masking to portions of an object.

Figure 2:
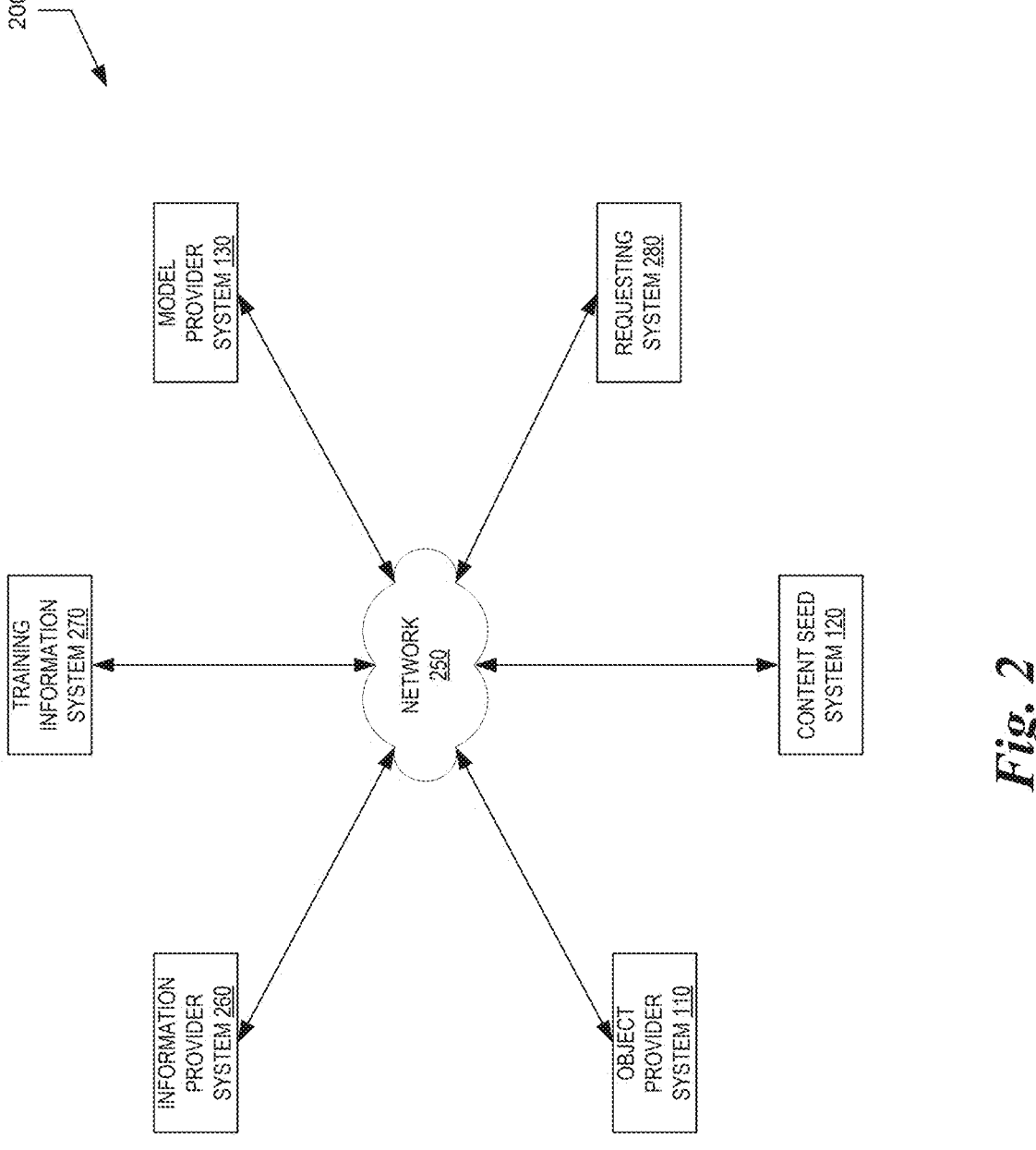
FIG. 2 is a block diagram of an illustrative operating environment for a system providing a machine model to generate objects according to some embodiments.

The model store 140 is a storage location configured to store one or more machine learning models trained to generate and/or regenerate objects according to an object format. The model store 140 may store a plurality of machine learning models, some of which may have been trained to perform different functions, and/or trained on different training information provided by the object provider system 110. A machine learning model stored by the model store 140 may, as discussed previously herein, be trained to generate objects according to a specific object format. Alternatively, a machine learning model stored by the model store 140 may be trained to generate objects according to an object format provided as input to the machine learning model (e.g., zero-shot object generation).
Example Object Generation Machine Learning Model Operating Environment With reference to an illustrative example, FIG. 2 shows an example environment 200 for providing a machine model to generate objects according to an object format. The environment 200 includes an object provider system 110, a content seed system 120, a model provider system 130, a network 250, an information provider system 260, a training information system 270, and a requesting system 280.

The network 250 may be a publicly-accessible network of linked networks, some or all of which may be operated by various distinct parties, for example the Internet. In some cases, network 150 may include a private network, personal area network, local area network, wide area network, cellular data network, satellite network, etc., or some combination thereof, some or all of which may or may not have access to and/or from the Internet.

The information provider system 260 may be a computing system configured to provide additional information for the generation of an object. The information provider system 260 may store structured or unstructured information in a manner that is retrievable by the model provider system 130 (e.g., by use of an API, scraping of website data generated by the information provider system 260, etc.). For example, where a user is attempting to generate an item listing for an item using the model provider system 130, the user may provide a URL of a website provided by an information provider system 260 where the item is already for sale. Examples of item information which may be included in the additional information of the information provider system 260 are text information (e.g., questions and answers, frequently asked questions, user reviews, plain language descriptions, blog posts, social media posts, etc.), image information, video information, audio information (e.g., speech information, music information, etc.), at least a portion of structured object information, a 3D point cloud information, a 3D model information, a multi-dimensional numeric array, or multimodal information (e.g., a PDF with images and text, a video with an audio track, etc.).

The training information system 270 may be a computing system configured to provide training data to the model provider system 130 for use in training a machine learning model to generate objects according to an object format. In some embodiments, the training information system 270 may be the object provider system 110, described previously herein in relation to FIG. 1.

The requesting system 280 may be a computing system associated with a user of the model provider system 130. The requesting system 280 is configured to provide a request to the model provider system 130 to perform object generation. The request may include, for example, an indication of an object provider system 110 and/or content seed system 120 from which information is to be retrieved for object generation. Alternatively, the request may contain the information to be used for object generation by the model provider system 130. For example, the requesting system 280 may be a personal computing device (e.g., a desktop computing device, a smartphone, etc.) belonging to a seller using the model provider system 130 to generate item listings for an online marketplace. In another example, the requesting system 280 may be a computing device used by an operator (e.g., a database administrator) of an object store 115 storing objects to be regenerated in an object format by the model provider system 130. Alternatively, the requesting system 280 may be a computing device associated with a user providing a content seed (e.g., from the content seed system 120) to the model provider system 130 for object generation. In some embodiments, the requesting system 280 may be the content seed system 120 and/or the object provider system 110.

Example Object Generation Machine Learning Model Routines

Figure 13:
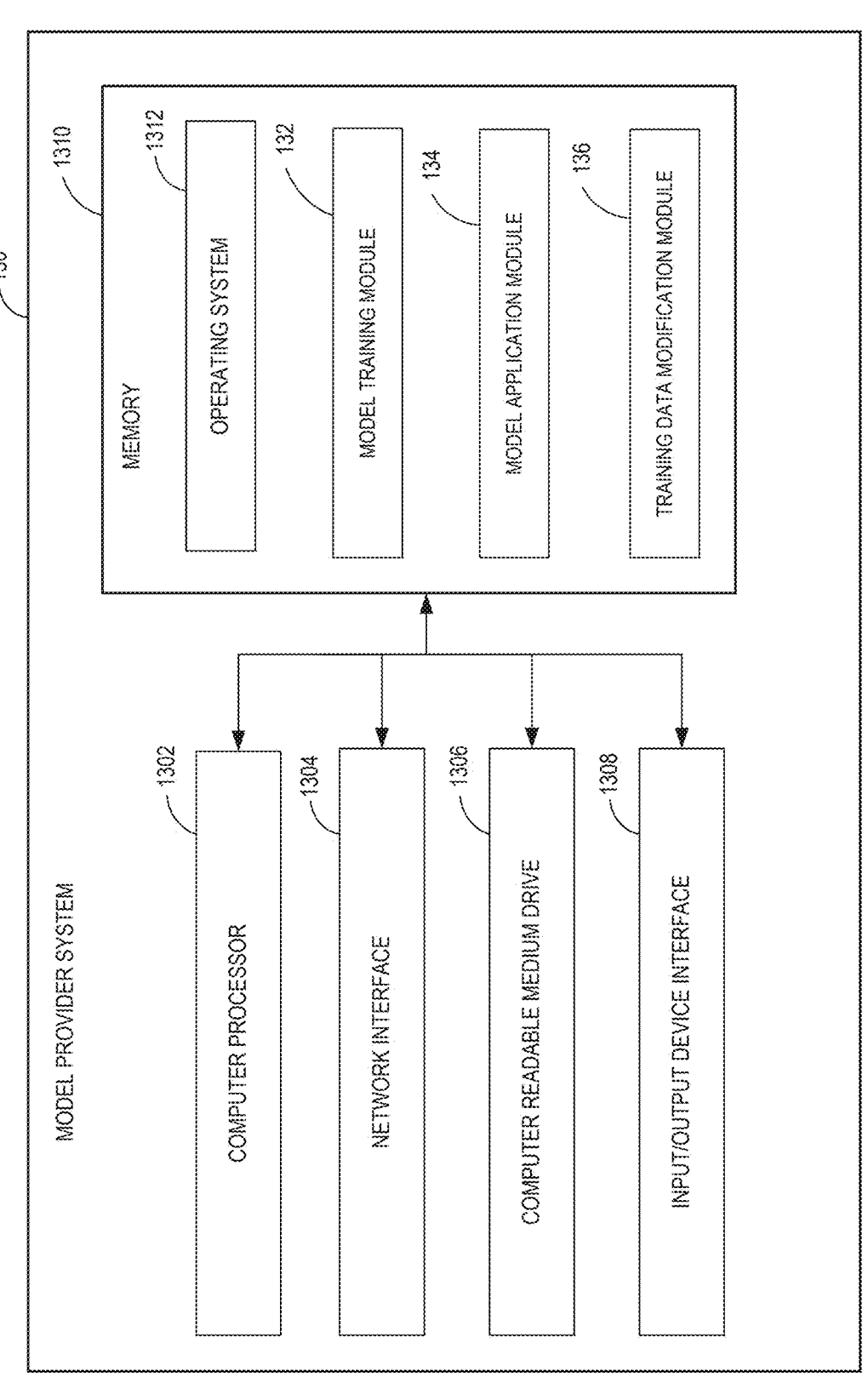
FIG. 13 is a block diagram of an illustrative computing system configured to generate or regenerate objects using a machine learning model according to some embodiments.

When a routine described herein (e.g., routine 300, 400, or 500) is initiated, a set of executable program instructions stored on one or more non-transitory computer-readable media (e.g., hard drive, flash memory, removable media, etc.) may be loaded into memory (e.g., random access memory or RAM) of a computing device, such as the first memory of the model provider system 130 shown in FIG. 13, and executed by one or more processors. In some embodiments, the routine 300, 400, and 500, or portions thereof may be implemented on multiple processors, serially or in parallel.

FIG. 3 illustrates example routine 300 for training a machine learning model to generate objects according to an object format. The routine 300 begins at block 302, for example in response to a request from a requesting system 280. For example, the request may be a natural language request from a user, provided via a user interface, which indicates a machine learning model is to be trained to generate objects according to an object format. In another example, the request may be to train a machine learning model to generate objects according to a provided object format (e.g., provided as a portion of an input to the machine learning model) in a zero-shot object generation arrangement. In a further example, the request may be to train a machine learning model to identify an object format from an object input, and regenerate the object, or later-provided objects, as an improved object. It should be understood that while reference is made to training a machine learning model, the routine 300 may be used to modify a previously trained machine learning model (e.g., by re-training or fine-tuning the previously trained machine learning model) to perform object generation.

At block 304, the model provider system 130 retrieves training data to train the machine learning model from a training information system 270 (e.g., the object provider system 110 of FIG. 1). For example, the model provider system 130 may transmit a training data request (e.g., using an application programming interface) to an object provider system 110. The training data request may be based in part on the request received from the requesting system 280 to perform training of a machine learning model of the model provider system 130. For example, the request may indicate an object format for which the machine learning model is to be trained, and the model provider system 130 may then generate a training data request for objects in the indicated object format.

In some embodiments, the model provider system 130 may retrieve objects individually to be provided to the machine learning model for training. Alternatively, the model provider system 130 may retrieve a plurality of objects (e.g., a database, an ecommerce catalogue, a repository of source code, etc.) of the object format, and store the plurality of objects temporarily for use in training the machine learning model. For example, the model provider system 130 may request at least some of the records of a database having the requested object format for training the machine learning model. The model provider system 130 may then store the records for additional processing, for example to generate additional training data as described further below herein, or to provide as input directly to the machine learning model.

At block 306, the training information modification module 136 of the model provider system 130 applies targeted noising to the retrieved training data to generate modified training data. Targeted noising may include altering the retrieved training data to include errors. To perform the targeted noising of training data, the training information modification module 136 may remove, or alter, a portion of an object included in the training data. In some embodiments, during targeted noising of the training data, a plurality of portions of the object may be removed or altered. During targeted noising of the training data, the training information modification module 136 may identify a first portion of the object to modify. The training information modification module 136 may then identify a second portion of the object to modify. The training information modification module 136 may then compare the information contained in the first portion and the second portion to determine whether the first portion and the second portion relate to a same element of the object. If the first portion and the second portion relate to the same information of the object, the training information modification module 136 may then determine whether any other portion of the object relates to the same element of the object. If no other portion of the object relates to the same element, the training information modification module 136 may determine that only one portion of the object relating to the same element may be modified, so that enough information remains for the machine learning model to generate a correct output object.

For example, where the object is an ecommerce listing, the training information modification module 136 may identify the title and a structured list of attributes belonging to the ecommerce listing. The training information modification module 136 may then determine that both the title and the structured list of attributes contain information indicating a color of an item represented by the ecommerce listing. The training information modification module 136 may then analyze the remaining portions of the ecommerce listing to determine whether an additional portion of the ecommerce listing indicates the color of the item. If the training information modification module 136 determines that an additional portion (e.g., an image, user reviews, etc.) indicates the color of the item, then the training information modification module 136 may modify color information contained in both the title and the structured list of attributes and still provide enough information for the machine learning model to generate color information in the output ecommerce listing. If the training information modification module 136 determines that no additional portion of the ecommerce indicates the color of the item, the training information modification module 136 may decide not to modify at least one of the title or the structured list of attributes in a way that alters the indicated color information, such that a correct, or potentially correct, color information remains available to the machine learning model to generate an ecommerce listing from the modified ecommerce listing. In this way, ecommerce listing training data is provided to the machine learning model which differs from the retrieved training data, but continues to provide enough information for the machine learning model to learn to generate a correct ecommerce listing.

Generating modified training data through targeted noising allows for the generation of additional training data from the retrieved training data. Advantageously, where limited training data is available to be retrieved, the additional training data may allow for improved training of the machine learning mode compared to systems where modified training data is not generated. Further, the use of modified training data to train the machine learning may reduce or eliminate the need for manual labelling of training data, improving the efficiency of training the machine learning model.

In some embodiments, the retrieved training data may have previously been generated through targeted noising, a sufficient amount of training data may have been retrieved such that targeted noising is not necessary to generate additional training data, or targeted noising of the training data may be otherwise determined to be undesirable or unnecessary, and block 306 may be omitted.

At block 308, the training information modification module 136 may apply further randomization to the modified training data. For example, if objects of the modified training data contain an element having an order (e.g., a structured list of attributes, a title, a natural language description, etc.) the training information modification module 136 may randomize, or otherwise alter, the order of the information in the element. Advantageously, applying further randomization to the training information, and using such training information to train a machine learning model, may improve the ability of the trained machine learning model to generate structured objects from unstructured, or differently structured input information. In some embodiments, further randomization may not be desirable, or useful, such as where the training data retrieved at block 304 had been previously generated through randomization of existing objects, or where a determination is made that the amount of retrieved training data is sufficient for training the model, and the routine 300 may omit block 308.

At block 310, the model training module 132 of the model provider system 130 provides the modified training data as input to a machine learning model to be trained. Providing the training data as input to the machine learning model may cause the machine learning model to generate an output, which may be stored by the model provider system 130.

At block 312, the model training module 132 compares the output of the machine learning model to the original training data. The result of the comparison may be a measure of the accuracy of the machine learning model in regenerating the original object from the training data, before the object was modified as part of the modified training data.

At block 314, the model training module 132 modifies the machine learning model based on the result of the comparison at block 312. In some embodiments, the machine learning model may be untrained, and the result of the model training module 132 modifying the machine learning model is a trained machine learning model. In alternative embodiments, the machine learning model may have previously been trained, for example as a large language model trained on a large corpus of text. The previous training may be related to the purpose for which the machine learning model is being modified herein (e.g., object generation). Alternatively, the previous training may be unrelated to the purpose for which the machine learning model is being modified herein. Modifying the machine learning model may include, for example, adjusting one or more weights connecting nodes of a neural network, modifying an encoder used to represent input data in an embedding space, or any other modification of a machine learning model known to be used during a machine learning model training process. Further, after modifying the machine learning model, a validation step may occur in order to determine whether additional training of the machine learning model is required. For example, one or more validation objects may be provided as input to the machine learning model and compared to an expected output (e.g., a ground truth dataset), and a threshold accuracy, or other target value, may be used to determine whether the machine learning model training is complete. When additional training of the machine learning model is required, at least one of the previously described blocks of the routine 300 may be repeated. Such repeated blocks may be repeated serially, or in parallel, for at least a portion of the retrieved training data.

At block 316, the model provider system 130 stores the trained machine learning model for later use. For example, the model provider system 130 may store the machine learning model in a model store 140. When storing the trained machine learning model, the model provider system 130 may include metadata associated with the trained machine learning model. For example, the metadata may indicate a type of training performed on the trained machine learning model, a training information system 270 or object store 115 from which training data was obtained to train the machine learning model, an object format for which the machine learning model is trained to generate objects, and the like. When the model provider system 130 has stored the machine learning model, the routine 300 moves to block 318 and ends.

Figure 4:
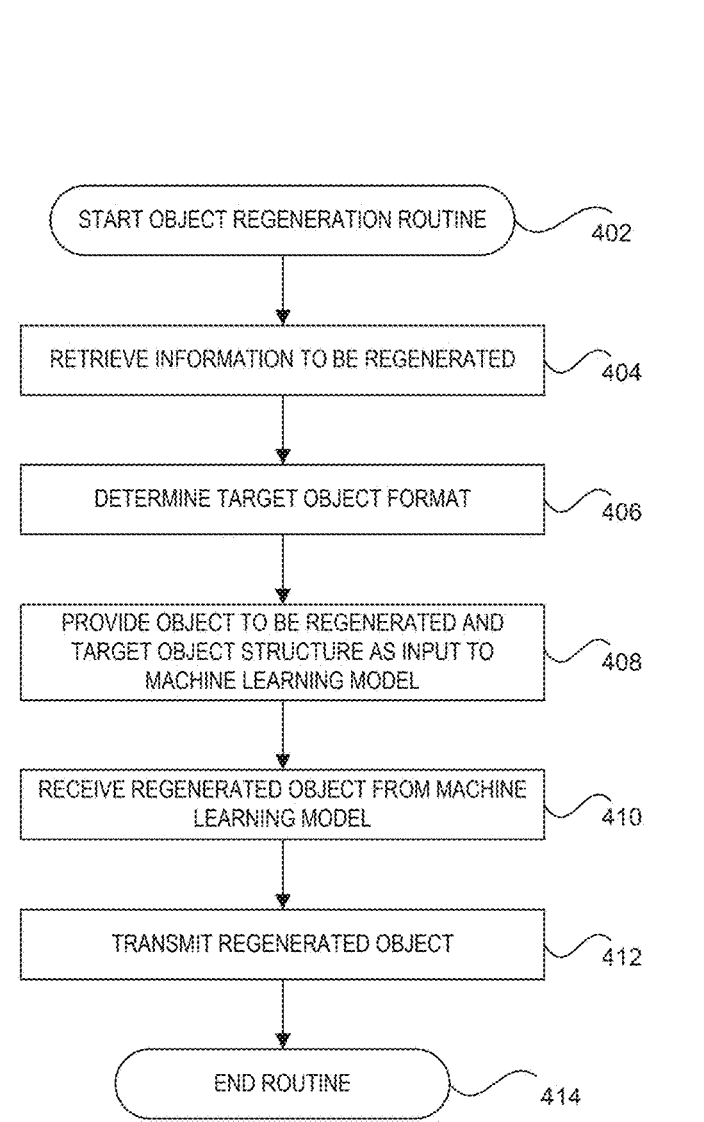
FIG. 4 is a flow diagram of an illustrative routine for regenerating an existing object using a machine learning model to create an improved object according to some embodiments.

FIG. 4 illustrates example routine 400 for regenerating an existing object according to an object format using a machine learning model. The routine 400 begins at block 402, for example in response to the model provider system 130 receiving a request to regenerate an object, from a requesting system 280. The request may be a natural language request from a user associated with the requesting system 280. Alternatively, the request may be an automatically generated request, generated by the requesting system 280 in response to determining that the object to be regenerated should be regenerated. For example, the requesting system 280 may determine that an object in an object store 115 is likely to be incomplete, likely to be incorrect, generated at a time before a current object format was used for objects stored in the object store 115, or for any other reason it may be useful to regenerate an object. The request received by the model provider system 130 may include an indication of an object provider system 110, or the object store 115, from which the object to be regenerated can be retrieved. In some embodiments, the request may indicate a plurality of objects to be regenerated, and the routine 400 may regenerate at least one of the indicated plurality of objects. Alternatively, the request may indicate a range of values associated with at least one object of an object store 115 for the model provider system 130 to retrieve. For example, the request may indicate that all objects last modified prior to a specific date should be retrieved for regeneration. In another example, where the objects to be regenerated are ecommerce listings, the request may indicate that all objects associated with an item type (e.g., men's clothing, hats, televisions, books, etc.) are to be regenerated.

At block 404, the model provider system 130 retrieves the information to be regenerated into an object from an object store 115, information provider system 260, or content seed system 120. For example, the model provider system 130 may send a retrieval request to a content seed system 120 to retrieve the information to be regenerated into an object from a content seed store 125. The information retrieved for object regeneration may be unstructured information (e.g., text information, multimodal information, etc.), or may be structured information (e.g., a previously generated object). The retrieval request may be based, at least in part, on the request received from the requesting system 280. In some embodiments, the model provider system 130 may determine the correct object provider system 110 or object store 115 to which the retrieval request should be sent. For example, where the request received from the requesting system 280 was a natural language request indicating the name of a database from which objects are to be regenerated, the model provider system 130 may identify an object provider system 110 associated with the database and transmit the retrieval request to the identified object provider system 110. In additional embodiments, the model provider system 130 may retrieve the object to be regenerated from a content seed store 125 by transmitting the retrieval request to a content seed system 120.

At block 406, the model provider system 130 determines the object format into which the object to be regenerated will be regenerated. The target object format may be indicated by the request received from the requesting system 280. Alternatively, the target object format may be known for the object store 115 from which the object to be regenerated was retrieved (e.g., the object format may be stored in a listing of object formats associated with object stores accessible to the model provider system 130). In another alternative, the object to be regenerated may be retrieved from a content seed system 120, and the model provider system 130 may retrieve an example object in the target object format from an object store 115 where the regenerated object will be stored. In embodiments where the machine learning model is configured for an object format, this determination may not be needed, and the routine 400 may move to block 408.

At block 408, the model provider system 130 provides the object to be regenerated and the target object format as input to a machine learning model 135 operating in the model application module 134, for example as part of a prompt to the machine learning model 135 to regenerate the object. The target object format may be provided as an outline, or schema, describing the target object format. Alternatively, the target object format may be provided using an example object which is already structured according to the target object format. In some embodiments, the object to be regenerated may be missing information useful to complete the object according to the target object format. Such information may be provided to the model application module 134 by the model provider system 130, for example as part of a prompt to the machine learning model to regenerate the object. Alternatively, the machine learning model may have been trained on a large corpus of information and may infer a correct value for the missing information based on latent knowledge learned from the large corpus of information on which the machine learning model was trained. Where there is missing information, an indication of the missing information may be included in the prompt to regenerate the object provided to the machine learning model, or the machine learning model may be relied on to determine the information is missing from the object to be regenerated.

At block 410, the model application module 134 provides the regenerated object to the model provider system 130. The regenerated object may have been generated by the model application module 134 using the machine learning model 135. The machine learning model 135 may generate the regenerated object in response to the input provided by the model provider system 130 at block 408. The regenerated object generated by the machine learning model 135 is an internally consistent object generated in a single pass of the machine learning model 135.

At block 412, the model provider system 130 transmits or stores the regenerated object. For example, the model provider system 130 may transmit the regenerated object to the requesting system 280. Alternatively, the model provider system 130 may transmit the regenerated object to an object provider system 110 for storage in an object store 115. The object store 115 where the regenerated object is transmitted may be the same object store 115 from which the object to be regenerated was retrieved, or may be a different object store 115. For example, the object to be regenerated may have been retrieved from an object store 115 belonging to a first ecommerce provider, and the regenerated object may be transmitted to an object store 115 belonging to a second ecommerce provider storing objects according to the object format into which the regenerated object was regenerated. When the model provider system 130 has transmitted the regenerated object, at least a portion of the routine 400 may repeat in order to regenerate additional retrieved objects (e.g., a set of records currently stored in a database). Portions of the routine 400 may be performed serially or in parallel during the regeneration of multiple objects. In some embodiments, the model provider system 130 may store a plurality of regenerated objects to be transmitted as a group. When the model provider system 130 has transmitted the regenerated object, or objects, and there are no further objects to regenerate, the routine 400 moves to block 414 and ends.

Figure 5:
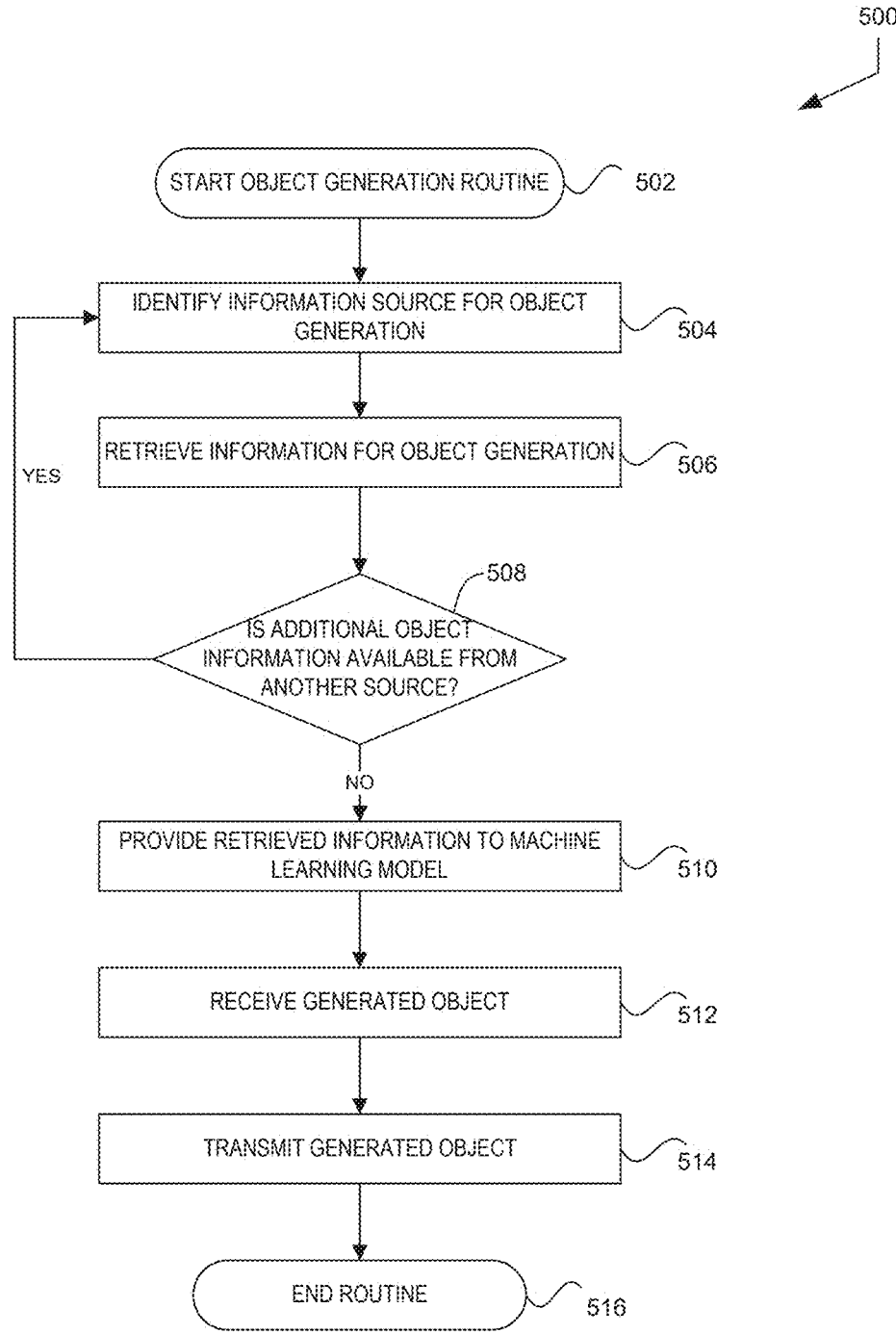
FIG. 5 is a flow diagram of an illustrative routine for generating an object using a machine learning model according to some embodiments.

FIG. 5 illustrates example routine 500 for generating an object in an object format using a machine learning mode. The routine 500 begins at block 502, for example in response to the model provider system 130 receiving a request from a requesting system 280 to generate an object in an object format. The request may be a natural language request received from a user associated with the requesting system 280. For example, the request may be received from a seller using an ecommerce platform, and the request may be to generate an ecommerce listing for an item. In another example, the request may be received from a database administrator, and the request may be to convert an object from a first database schema to a second database schema. In some embodiments, the request may indicate a target object format according to which the object is to be generated. Alternatively, the model provider system 130 may determine the object format from information provided in the request, for example a target object provider system 110 to which the generated object is requested to be transmitted.

At block 504, the model provider system 130 identifies an information source for information used to generate the requested object. In some embodiments, the information source may be a content seed system 120 or an object provider system 110. The model provider system 130 may identify the information source based on the request, or the request may explicitly identify the information source to be used to generate the object.

At block 506, the model provider system 130 retrieves information to be used for object generation from the identified information source. The retrieved information may be, for example, an existing object in a same or a different object format, unorganized text information associated with the object to be generated, an image, a sound, a video, or any other source from which information may be identified or generated to generate the requested object.

At decision block 508, the model provider system 130 determines whether another information source may have information useful for generating the requested object. For example, where the requested object is an ecommerce listing for a first ecommerce provider, a first information source identified in the request may be a content seed store 125. The model provider system 130 may then determine that a second information source for the object to be generated may be an alternative ecommerce provider, for example by performing a search for related information using a machine learning model. The routine 500 may then return to block 504, and the model provider system 130 may identify the alternative ecommerce provider as an information source for object generation. In another example, the requested object may be a database record, and the initial information source identified may be a first object store 115 having a different database schema than a target object store 115 indicated in the request. The model provider system 130 may then determine that additional information useful for generating the requested object exists in the target object store 115, and return to block 504 to retrieve information from the object store 115 useful for generating the requested object. When the model provider system 130 determines that there is no additional object information available from another source, or that a sufficient amount of information to generate the requested object has been retrieved, the routine 500 moves to block 510. Additionally, it should be understood that as an alternative to repeating block 504 and block 506 for each information source, the model provider system 130 may comprise a plurality of information retrievers which retrieve some or all of the information used to generate the requested object from different data sources in parallel.

At block 510, the model provider system 130 provides the retrieved information useful for generating the requested object to the model application module 134. The model application module 134 may then provide the information to one or more machine learning models, for example a machine learning model obtained from the model store 140. The information may be provided to the machine learning model as part of a prompt. The prompt may be written in natural language. The prompt may include at least a portion of the request, for example if the request includes a target object format the prompt may include the target object format. Additionally, the prompt may include an exemplary object from which the machine learning model can determine the target object format. Further, the prompt may include additional information, for example a type of the target object store 115 at which the generated object will be stored, an object definition (e.g., a schema for a database object, a software object definition, etc.), or a requirement of the generated object (e.g., a maximum size of a portion of the generated object, a maximum size of the generated object, a minimum number of attributes for the generated object, etc.). Further, the prompt may indicate to the machine learning model that where a portion of the generated object cannot be generated based on the provided information, the machine learning model is to infer a likely value based on existing knowledge of the machine learning model (e.g., latent knowledge of a large language model stored by the large language model during training).

At block 512, the model application module 134 transmits the generated object to the model provider system 130. The machine learning model 135 of the model application module 134 may generate the generated object based on the retrieved information provided to the model application module 134 at block 510. The machine learning model 135 may then generate the generated object in a single pass, where the generated object is an internally consistent object. Additionally, the machine learning model 135 may provide additional information, such as a source of the information used to generate a portion of the generated object, an indication that a portion of the generated object was inferred from latent knowledge of the machine learning model, a confidence score indicating a confidence of the machine learning model that the generated object was correctly generated, an indication of an attribute in which the generated object that the machine learning model has a low confidence, and the like. The model application module 134 may then provide such additional information to the model provider system 130. Further, the machine learning model of the model application module 134 may receive retrieved information from a plurality of information sources, which may store information in different formats. The retrieved information may also include conflicting information from different information sources (e.g., a first information source may provide a first value for the size of a shirt, and the second information source may provide a second value for the size of the shirt). The machine learning model may then reconcile the conflicting information as part of generating the requested object.

At block 514, the model provider system 130 transmits or stores the generated object. For example, the model provider system 130 may transmit the generated object to the requesting system 280. Alternatively, the request may indicate a target object provider system 110 or object store 115 to which the generated object is to be transmitted. When the model provider system 130 has transmitted the object, the routine 500 moves to block 516 and ends.

Example Ecommerce Object Generation

Figure 6:
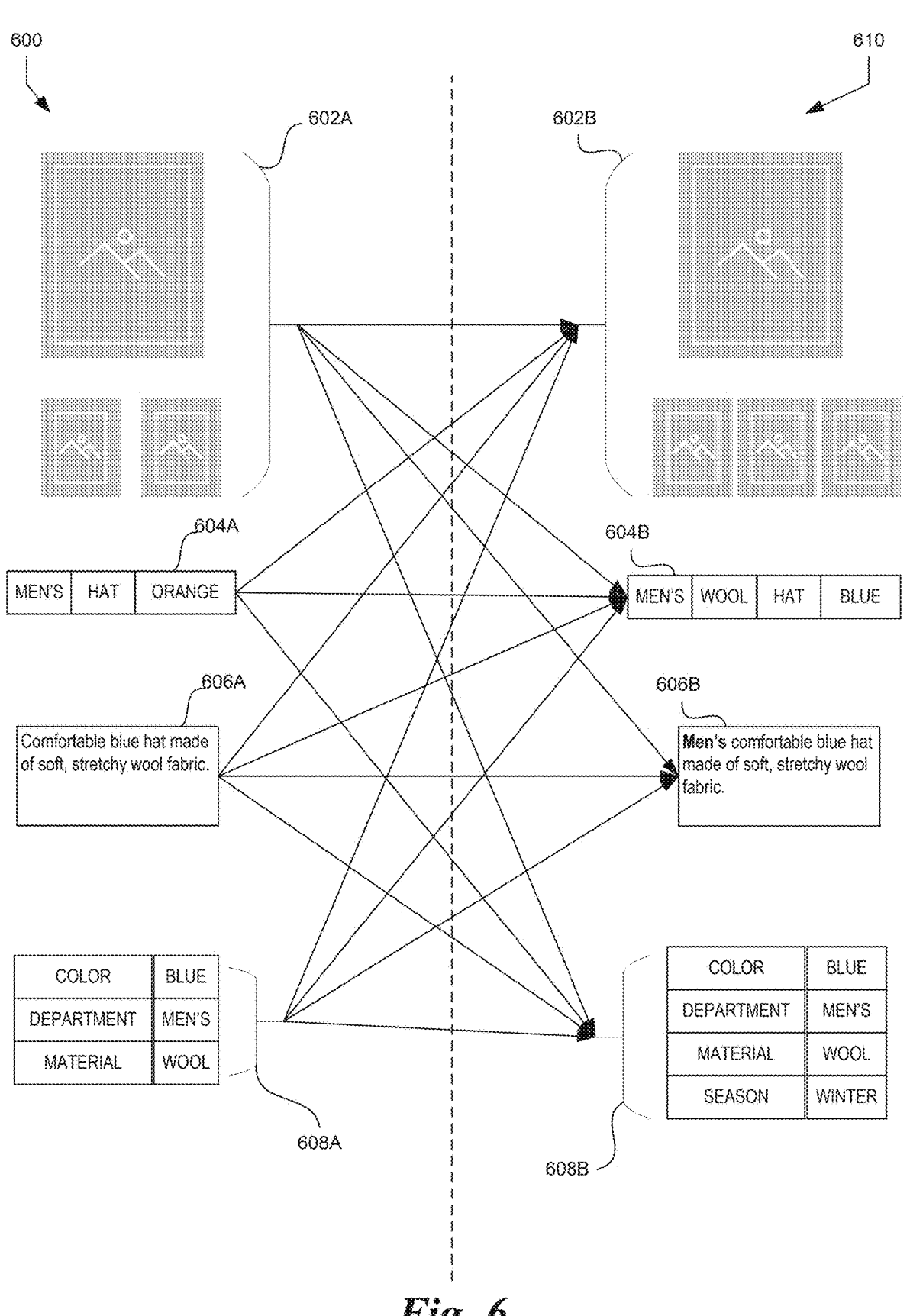
FIG. 6 is a block diagram of an illustrative example object regeneration in an ecommerce environment according to some embodiments.

FIG. 6 illustrates a graphical representation of object regeneration for a listing on an ecommerce platform using the system described previously herein. While the present example relates to a listing on an ecommerce platform, it should be understood that the description herein may be applied to objects or listings for alternative platforms, for example review platforms, content provider platforms (e.g., video content providers, image providers, etc.), and the like. Additionally, while in the present example objects are generally described as listings for an ecommerce platform having defined formats, it should be understood that the description herein may be applied to an object having any format, including multimodal objects.

An initial listing 600 includes an initial image set 602A, an initial title 604A, an initial description 606A, and an initial structured attribute set 608A.

The initial image set 602A is a set of one or more images representative of an item associated with the listing. For example, the image set may include images of different viewpoints of the item (e.g., a cross-sectional view, frontal view, interior view, etc.), or different uses of the item (e.g., a clothing item being worn, a utility item in use, etc.). Such images may be in color, black and white, and/or grayscale. Further, the images may be useful for the determination of item information for the item. For example, the images may be used by a machine learning model to identify a brand, a size, a style, a use, a physical attribute, and the like, for the item.

The initial title 604A is a textual representation of a summary of item information. The initial title 604A may be manually generated, for example by the seller, or automatically generated. The initial title 604A may be a summary of details of the item, and may be intended to provide sufficient information to a potential buyer to generate interest in the item.

The initial description 606A is a detailed description of the item, and may include text, images, video, audio, and multimedia information. In the example described herein related to FIG. 6, the initial description 606A is a textual detailed description of the item. The initial description 606A may have been manually generated, or automatically generated. The initial description 606A may include item details for the item associated with the initial listing 600. The initial description 606A may further include marketing copy, such as descriptions of how the use of the item may improve a potential customer's life, or otherwise positively affect the potential customer. Therefore, a machine learning model of the model provider system 130 may, when regenerating the listing to generate the regenerated listing 610, parse the initial description 606A to identify useful item information and separate such useful item information from the marketing copy.

The initial structured attribute set 608A is a structured listing (e.g., a table) of attributes associated with the item. The initial structured attribute set 608A may include attribute information formatted according to a defined structure. The defined structure may be common to a set of items (e.g., a set of attributes common to all hats, all clothing, etc.).

The regenerated listing 610 is an item listing generated by the model provider system 130 using at least part of the initial listing 600 as input. The regenerated listing 610 includes a regenerated set of images 602B, a regenerated title 604B, a regenerated description 606B, and a regenerated structured attribute set 608B. The regenerated listing 610 may be generated for the same ecommerce platform, or for a different ecommerce platform having a different item listing schema. As indicated by the arrows between the elements of the initial listing 600 and the elements of the regenerated listing 610, a plurality of elements of the initial listing 600 may be used by the model provider system 130 to generate the regenerated listing 610. It should be understood that the many arrows shown in the figure are illustrative of possible combinations of information from the initial listing 600 which may be used to generate portions of the regenerated listing 610. Alternative implementations may use more, fewer, or alternative combinations of portions of the initial listing 600 to generate portions of the regenerated listing 610. Further, the arrows shown here do not represent individual executions of a machine learning model. Instead, all portions of the regenerated listing 610 are generated as part of a single pass of the machine learning model, based on receiving the initial listing 600 as input to the single pass, ensuring that the regenerated listing 610 comprises internally consistent information between portions of the regenerated listing 610.

Advantageously, the machine learning model of the model provider system 130 used to regenerate the initial listing 600 may regenerate each element of the initial listing 600 during a single pass. Regenerating the initial listing 600 in a single pass may allow the model provider system 130 to ensure that each element of the regenerated listing 610 is internally consistent. That is, the model provider system 130 may ensure that a first element of the regenerated listing 610 does not provide information which conflicts with a second element of the regenerated listing 610. For example, as shown here, the initial listing 600 includes the initial title 604A which indicates the men's hat is orange. However, this conflicts with the indication in the initial description 606A and the initial structured attribute set 608A that the hat is blue. When regenerating the initial listing 600 to generate regenerated listing 610, but using information from multiple elements of the initial listing 600 and generating the regenerated listing 610 in a single pass, the model provider system 130 ensures that the regenerated title 604B, regenerated description 606B, and regenerated structured attribute set 608B are consistent in their description of the hat as being blue.

During generation of the regenerated listing 610, the model provider system 130 may use information from any number of elements of the initial listing 600. Additionally, the machine learning model used by the model provider system 130 may infer, based on the training of the machine learning model, that one or more elements are more likely to indicate a correct value for an item attribute, for example based on the portion of the object where the element and associated value are identified. Therefore, while in the present example two elements of the initial listing 600 indicate the hat is blue, and this is taken as correct in the regenerated listing 610, it should be understood that such a determination of the correct attribute value may not be based on the number of elements agreeing on the attribute value. For example, the machine learning model may infer, based on its training, that an image is the most likely to indicate a correct attribute value for color. The machine learning model of the model provider system 130 may then generate a regenerated title 604B, regenerated description 606B, and regenerated structured attribute set 608B which indicate a different color (e.g., green) based on the initial image set 602A, even though the initial description 606A and initial structured attribute set 608A agree on the color blue.

Further, when generating the regenerated listing 610, the model provider system 130 may include additional information in one or more of the portions of the regenerated listing 610. For example, as shown here, the regenerated title 604B includes the word "wool" indicating the material of the hat, and the regenerated structured attribute set 608B includes an additional element of "season" with the value "winter". This additional information may be included based on the schema for the ecommerce platform indicating a material type is to be included in an item title for clothing. Alternatively, the additional information may be included based on training of the machine learning model of the model provider system 130 indicating that a material should be included in the title for this item.

Figure 7:
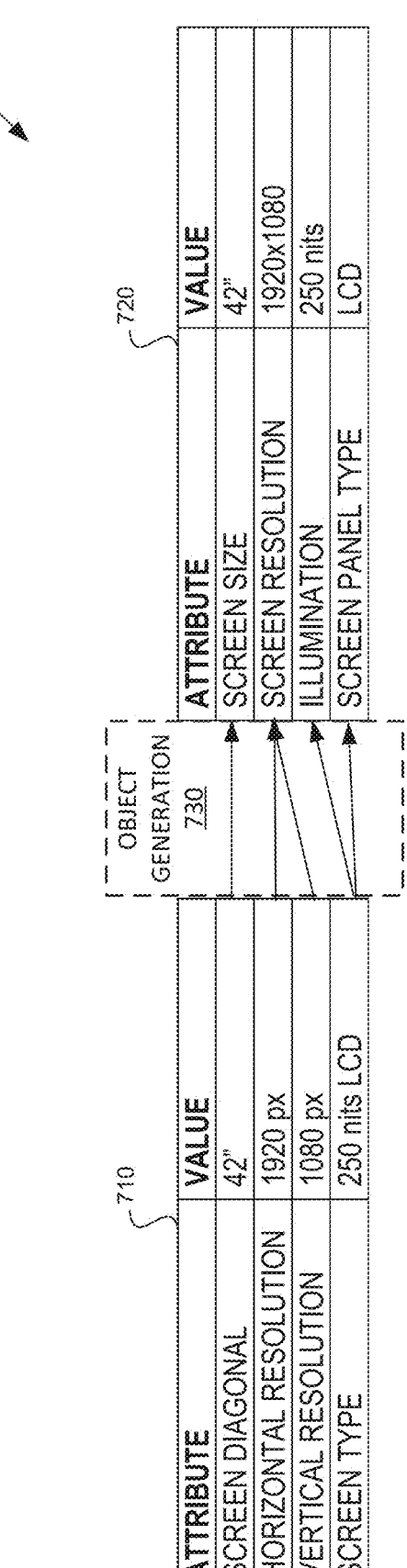
FIG. 7 is an illustrative example of generating an object according to a target schema from organized retail information using a machine learning model according to some embodiments.

FIG. 7 illustrates an example generation of a generated structured set of item attributes 720 for a target ecommerce platform from an existing structured set of item attributes 710 from a source ecommerce platform having a different schema for organizing item information. While the existing structured set of item attributes 710 and generated structured set of item attributes 720 of this example are displayed in tabular form, it should be understood that the tabular format is used herein for ease of description only and other data formats (e.g., JSON objects, list data objects, etc.) capable of storing item information may be used. Further, while the present example relates to item listings for ecommerce platforms, the description herein may be applied to any structured object.

The existing structured set of item attributes 710 include a plurality of attributes associated with an item. Each attribute of this example has a unique identifier indicating the attribute type (e.g., Screen Diagonal, Screen Type, etc.) and an associated value. Further, the generated structured set of item attributes 720 includes a set of attributes used by a target ecommerce platform for which the generated structured set of item attributes 720 was generated. The model provider system 130 may be provided with the existing structured set of item attributes 710 and a request to generate the generated structured set of item attributes 720 using the routine 400 or routine 500 described previously herein in relation to FIGS. 4 and 5. When performing object generation 730, the machine learning model of the model provider system 130 may determine attribute types of the target ecommerce platform corresponding to attribute types of the source ecommerce platform. Further, the model provider system 130 may determine that a unit of measurement for an attribute of the existing structured set of item attributes 710 is different from a unit of measurement for an attribute of the generated structured set of item attributes 720. The model provider system 130 may then normalize the values of the existing structured set of item attributes 710 for the generated structured set of item attributes 720 by converting between the unit of measurement of the source ecommerce platform and the target ecommerce platform. Normalization may also include, for example, normalizing an element type, normalizing a value of an element, or normalizing a length of a value.

As shown in this example, some attributes may have an attribute type and associated value in the existing set of item attributes which corresponds to two or more attributes in item listings of the target ecommerce platform. Therefore, when performing object generation 730, the model provider system 130 may determine an attribute type of the target ecommerce platform corresponds to a plurality of attribute types of the source ecommerce platform. The model provider system 130 may then assign attribute values from each of the plurality of attribute types of the source ecommerce platform to the associated attribute type of the target ecommerce platform. Relatedly, the model provider system 130 may determine a plurality of attribute types of the target ecommerce platform correspond to a single attribute of the source ecommerce platform. The model provider system 130 may then assign the value from the single attribute type of the source ecommerce platform to the plurality of attribute types of the target ecommerce platform. While a one to many, and many to one, relationship have been described herein, it should be understood that the same description applies to many attribute relationships as well.

Figure 8:
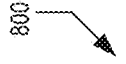
FIG. 8 is an illustrative example of generating an object from unordered information according to a target schema using a machine learning model according to some embodiments.

FIG. 8 illustrates an example generation of a set of item attributes 820 from a source image 810 using object generation 830. While the present example relates to generating item attributes for an item listing for ecommerce platforms, the description herein may be applied to generating any structured object.

The source image 810 of this example is a backpack, and includes a caption indicating the backpack is designed for girls. While the source image 810 has a caption in the present example, it should be understood that no caption is required for the generation of the set of item attributes 820 by the model provider system 130 during object generation 830.

To generate the set of item attributes 820, the model provider system 130 receives the source image 810 as input. The source image 810 is then applied as input to a machine learning model using the model application module 134 to generate the set of item attributes 820. The structure of the set of item attributes 820 may be provided as input to the machine learning model, or the structure of the set of item attributes 820 may be understood by the machine learning model based on its training (e.g., as described above in relation to FIGS. 4 and 5). The machine learning model of the model provider system 130 generates the entirety of the set of item attributes 820 in a single pass, meaning that the entire set of item attributes 820 is generated without the need to use the model application module 134 for each attribute of the set of item attributes 820 individually. Generating the set of item attributes 820 in a single pass ensures that the attributes generated during object generation 830 are internally consistent with each other, without the need for additional computing resources to verify such consistency. Advantageously, ensuring internal consistency both improves the speed of the object generation 830 and use of the set of item attributes 820, while improving the overall quality of the set of item attributes 820 generated by the model provider system 130.

Where attribute information of the set of item attributes 820 is not explicitly indicated by the source image 810, the machine learning model of the model provider system 130 may infer such values based on many factors, including generated attribute values based on the source image 810, and contextual information available to the machine learning model based on the training of the machine learning model. For example, no element of the source image 810 indicates the "Department" attribute value for the set of item attributes 820. During object generation 830, the machine learning model may determine the value of the "Department" attribute has a value of "Children-Girls" based on the caption, the image, other attributes of the set of item attributes 820, and/or the latent knowledge of the machine learning model.

Example Training Data Generation

FIG. 9 illustrates an example generation of noisy object information 910 from initial object information 900 by the training information modification module 136 of the model provider system 130. The initial object information 900 includes an initial title 902, an initial description 906, and an initial set of attributes 904. The noisy object information 910 includes a noisy title 912, a noisy description 916, and a noisy set of attributes 914.

The initial object information 900 may be provided as input to the training information modification module 136. The training information modification module 136 may then, as shown in this example, determine portions of the initial object information 900 which may be altered with noise information to generate additional training data as described previously herein. The training information modification module 136 in this example adds a color value to the noisy title 912 of the noisy object information 910, where the added color value of the noisy title 912 conflicts with the color value of the initial set of attributes 904 and noisy set of attributes 914, and where there was no color value present in the initial title 902. Further, the training information modification module 136 in this example alters the "Size" attribute of the noisy set of attributes 914 and the "Brand" value of the noisy set of attributes 914 to a value that is inconsistent with the initial title 902 and the noisy title 912. Additionally, the training information modification module 136 may add elements unrelated to, or otherwise not included in an object format of, an initial object from which a noisy object is being generated. In the present example, the training information modification module 136 adds the "RAM memory" attribute to the noisy set of attributes 914. Notably, the "RAM memory" attribute does not exist in the initial set of attributes 904, and would not normally be associated with shoes. The training information modification module 136 further applies noise to the initial description 906 to generate the noisy description 916. In this example, the training information modification module 136 removes information in the initial description 906 indicating the material associated with the shoes, and changes the word "and" in the initial description 906 to a symbolic representation of "&&" in the noisy description 916. This noisy set of attributes 914 may then be used as one portion of the training data provided to the machine learning model during training by the training information modification module 136.

Example Object Generation User Interfaces

FIG. 10 illustrates an example user interface 1050 providing a verbose output 1080 explaining changes made when regenerating the listing title 1060 and listing attributes 1070 from the initial listing 1000 using a machine learning model of the model provider system 130.

The initial listing 1000 may be a previously stored item listing of an ecommerce platform. Alternatively, the initial listing 1000 may be a listing for an item on a second ecommerce platform. While listings on ecommerce platforms are described in relation to this figure, it should be understood that the model provider system 130 may provide a verbose output describing changes made to any object regenerated by the model provider system 130. It should be noted that the model provider system 130 may have generated the listing title 1060 and the listing attributes 1070 in a single pass, using the initial listing 1000 as input. Generating the listing title 1060 and the listing attributes 1070 in a single pass allows for efficiently ensuring internal consistency between the listing title 1060 and the listing attributes 1070.

The verbose output 1080 indicates to a user of the model provider system 130 what changes were made when regenerating the initial title 1010 and the initial listing attributes 1020 to generate the listing attributes 1070 and listing title 1060. The verbose output 1080 may be provided to a user via a graphical user interface presented by, for example, a display of the requesting system 280. In some embodiments, the user may then provide feedback, such as by editing the listing title 1060 and/or the listing attributes 1070. Providing the verbose output 1080 to the user may allow the user to more efficiently determine whether any such manual adjustments are desirable. While only text is shown in the user interface 1050 of this example, images, video, audio, and/or multimedia may be included in the user interface 1050.

Figures 11A, 11B, 11C:
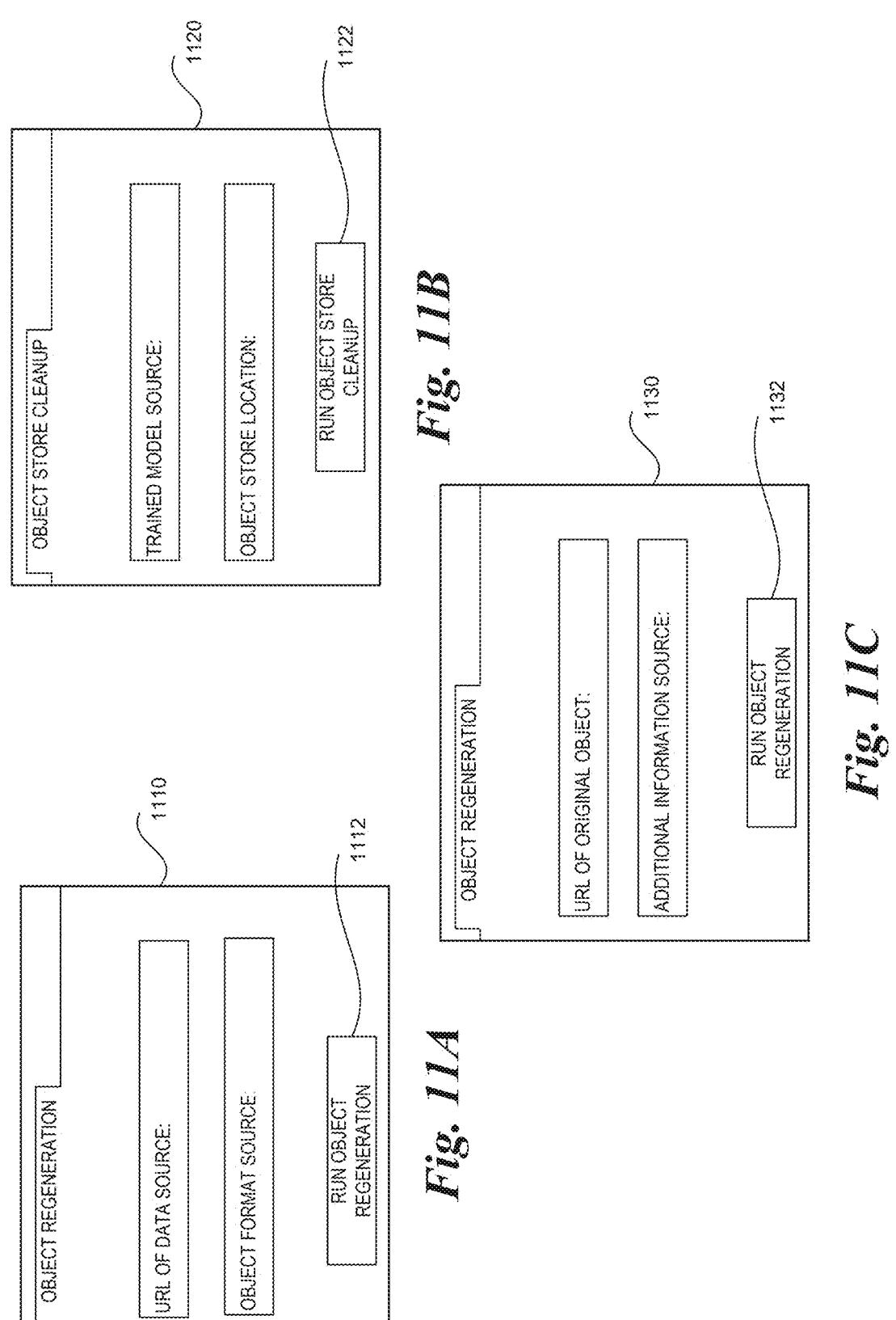
FIG. 11A is an illustrative example of a user interface for providing regeneration of an object from a source provided by a user according to some embodiments.
FIG. 11B is an illustrative example of a user interface for providing object cleanup of a data store provided by a user according to some embodiments.
FIG. 11C is an illustrative example of a user interface for providing regeneration of an object from a source based on a content seed provide by a user according to some embodiments.

FIG. 11A illustrates an example user interface 1110 for allowing a user to regenerate objects from a data source provided by the user (e.g., a first object store 115) using an object format provided by the user. In this example, the machine learning model of the model provider system 130 is assumed to be trained to perform zero-shot object regeneration using an object and an object format as input. When the user presses the button 1112, the model provider system 130 regenerates all objects stored at the provided data source using the provided object format.

FIG. 11B illustrates an example user interface 1120 for allowing a user to perform a cleanup operation on an object store location provided by the user (e.g., object store 115) using a previously trained machine learning model, where the location of the previously trained machine learning model is provided by the user. The model application module 134 of the model provider system 130 may retrieve the machine learning model indicated by the user (e.g., from a model store 140). The model application module 134 may then apply at least one object from the indicated object store location as input to the machine learning model to regenerate the object and create an improved object. This operation is referred to as object store cleanup, and results in an improved set of objects stored by the object store, for example because the regenerated object more closely aligns with the object format on which the machine learning model was trained. In some embodiments, the user may not need to provide a trained model source. In such embodiments, the model provider system 130 may train a machine learning model on the information retrieved from the provided object store location to perform the cleanup operation on the object store 115 (e.g., using the routine 300 described previously herein). The information from the object store 115 may then be provided to the newly trained machine learning model as input, and the output of the machine learning model may replace at least a portion of the object information stored in the object store 115.

FIG. 11C illustrates an example user interface 1130 for allowing a user to regenerate an object with additional information (e.g., a content seed) from a content seed source provided by the user. When the user presses the button 1132, the object and the additional information are provided as input to a machine learning model by the model provider system 130 to regenerate the information in an improved or complete form as a regenerated object, for example by including at least a portion of the information contained in the additional information. In some embodiments, the model provider system 130 may process the additional information to reduce the information content of the content seed to a minimum amount of information required by the machine learning model to generate the object. Such a reduction in the information content of the content seed may reduce duplicate information, and enable for more efficient object generation by the model provider system 130.

Figure 12:
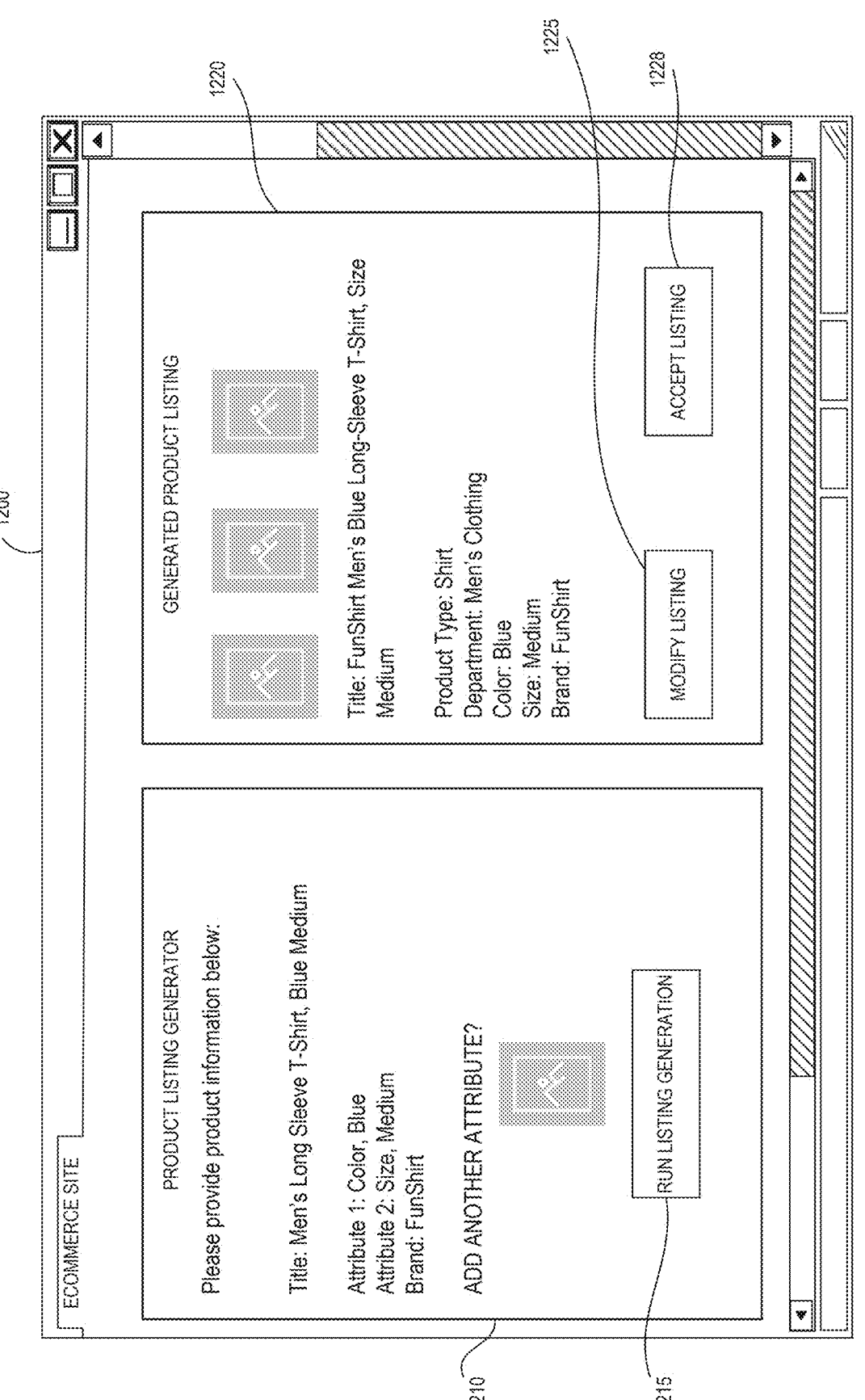
FIG. 12 is an illustrative example of a user interface for providing the automated generation of online retailer listings for a seller according to some embodiments.

FIG. 12 illustrates an example user interface 1200 for allowing a user to generate an item listing for an ecommerce platform. The user interface 1200 includes an information entry portion 1210, and a generated listing display portion 1220.

The information entry portion 1210 of this example allows a user (e.g., a seller or potential seller on the ecommerce platform) to enter item information for an item to be listed on the ecommerce platform. For example, the user may provide a title, attribute information associated with the item, images, audio, video, and/or multimedia. When the user has completed entry of the available item information, the user may select a button 1215 to indicate that the model provider system 130 is to generate the item listing. When the button 1215 has been interacted with by the user, the model application module 134 provides the item information in the information entry portion 1210 as part of an input to a machine learning model which may have been trained to generate item listings for the ecommerce platform. Alternatively, the machine learning model may be generally trained for object generation, and may be provided the item information in the information entry portion 1210 and object format information for the ecommerce site (e.g., an example item listing, a schema, etc.) as input.

When the generated item listing has been received from the model provider system 130, the generated item listing is presented to the user in the generated listing display portion 1220. As shown, the generated item listing may include additional media (e.g., images, video, multimedia, etc.) generated by the model provider system 130, a title, and a structured set of item attributes. While not shown here, the generated listing display portion 1220 may additionally display other item information generated by the model provider system 130 as part of an item listing. For example, the generated item listing may include previous user reviews, a natural language description of the item, a price, or any other item information the machine learning model of the model provider system 130 is trained to generate based on the item listing schema for the ecommerce platform.

Further, the generated listing display portion 1220 may include a button 1225 allowing the user to modify the generated item listing, and a button 1228 allowing the user to accept the generated item listing. If the user interacts with the button 1228 to accept the generated item listing, the generated item listing may be provided to an object store 115 associated with the ecommerce platform used to store item listings. In some embodiments, providing the generated item listing to the object store 115 may cause the item to be listed for sale on the ecommerce platform.

Execution Environment

FIG. 13 illustrates various components of an example model provider system 130 configured to implement various functionality described herein.

In some embodiments, the model provider system 130 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the model provider system 130 may be implemented as web services consumable via one or more communication networks. In further embodiments, the model provider system 130 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a model provider system 130 may include: one or more computer processors 1302, such as physical central processing units ("CPUs"); one or more network interfaces 1304, such as a network interface cards ("NICs"); one or more computer readable medium drives 1306, such as a high density disk ("HDDs"), solid state drives ("SSDs"), flash drives, and/or other persistent non-transitory computer readable media; one or more input/output device interfaces 1308; and one or more computer-readable memories 1310, such as random access memory ("RAM") and/or other volatile non-transitory computer readable media.

The computer-readable memory 1310 may include computer program instructions that one or more computer processors 1302 execute and/or data that the one or more computer processors 1302 use in order to implement one or more embodiments. For example, the computer-readable memory 1310 can store an operating system 1312 to provide general administration of the model provider system 130. As another example, the computer readable memory 1310 can store model training module 132. As another example, the computer-readable memory 1310 can store a model application module 134. As another example, the computer-readable memory 1310 can store a training information modification module 136.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

a computer-readable memory comprising a machine learning model; and one or more processors in communication with the memory, wherein computer-executable instructions, when executed by the one or more processors, cause the one or more processors to at least:

generate information to provide an interactive graphical user interface;

receive a request, via the interactive graphical user interface, to generate an item listing for an item, wherein the request further comprises an indication of a content platform;

retrieve a content seed comprising item information associated with the item;

generate the item listing based in part on providing the content seed as input to the machine learning model, wherein the item listing is formatted according to an object format associated with the content platform, and wherein the item listing is generated in a single pass, wherein to generate the item listing in a single pass, an input is provided to the machine learning model resulting in an output through a single unit of execution of the machine learning model without the machine learning model retaining a previous input; and store the item listing in a database associated with a commerce platform, wherein storing the item listing in the database causes an item associated with the item listing to be presented by the commerce platform as available for commerce.

2. The system of claim 1, wherein the machine learning model is configured to generate item listings according to the object format.

3. The system of claim 1, wherein the computer-executable instructions, when executed, further cause the one or more processors to:

retrieve an example item listing formatted according to the object format;

provide the example item listing as further input to the machine learning model, wherein the item listing is generated based in part on the example item listing.

4. The system of claim 1, wherein the machine learning model is a large language model.

5. A computer-implemented method comprising:

under control of a computing device comprising one or more processors configured to execute specific instructions, receiving a request to generate an item listing;

retrieving a content seed;

providing the content seed as input to a machine learning model;

obtaining the item listing based in part on an output of the machine learning model generated in response to the content seed being provided as input to the machine learning model, wherein the item listing is generated in an object format, and wherein the item listing is generated in a single pass of the machine learning model such that the content seed being provided as input to the machine learning model results in generation of the output through a single execution unit of the machine learning model; and transmitting the item listing.

6. The computer-implemented method of claim 5, further comprising:

identifying an object store storing a plurality of item listings associated with a content platform indicated in the request, wherein the content seed is retrieved from the object store.

7. The computer-implemented method of claim 5, wherein the single execution unit of the machine learning model occurs without the machine learning model retaining a previous input.

8. The computer-implemented method of claim 5, further comprising:

identifying an object store storing a plurality of existing item listings for an online platform indicated by the request, wherein the plurality of existing item listings is in the object format; and retrieving an existing item listing of the plurality of existing item listings from the object store, wherein the machine learning model further generates the item listing in response to being provided the existing item listing.

9. The computer-implemented method of claim 5, further comprising:

identifying an object store storing a plurality of existing item listings for an online platform indicated by the request, wherein the plurality of existing item listings are in the object format;

identifying a content seed store storing a plurality of existing content seeds associated with the plurality of existing item listings;

providing at least one content seed of the plurality of existing content seeds as input to the machine learning model;

obtaining at least one training output based in part on the output of the machine learning model generated in response to the at least one content seed being provided as input to the machine learning model;

comparing the at least one training output to at least one existing item listing of the plurality of existing item listings to generate a comparison result; and updating the machine learning model based on the comparison result, wherein the result of updating the machine learning model is to train the machine learning model to generate item listings in the object format.

10. The computer-implemented method of claim 5, further comprising:

identifying a machine learning model store where the machine learning model indicated by the request is stored, wherein the machine learning model is configured to generate item listings in the object format;

retrieving the machine learning model from the machine learning model store.

11. The computer-implemented method of claim 5, further comprising:

determining the content seed is missing an information item used by the machine learning model to generate the item listing in the object format, wherein generating the at least one training output by the machine learning model comprises inferring a value for the information item based at least in part on latent knowledge of the machine learning model.

12. The computer-implemented method of claim 5, further comprising:

processing the content seed to reduce a total amount of information of the content seed, wherein the total amount of information of the content seed is reduced to a minimum amount of information needed by the machine learning model to generate the item listing.

13. A non-transitory machine-readable storage medium encoded with instructions executable by a processor of a computing device, wherein the instructions, when executed by the processor, cause the computing device to at least:

receive a request to generate an item listing;

retrieve a content seed;

provide the content seed as input to a machine learning model;

obtain the item listing based in part on an output of a machine learning model generated in response to the content seed being provided as input to the machine learning model, wherein the item listing is generated in an object format, and wherein the item listing is generated in a single pass of the machine learning model such that the content seed being provided as input to the machine learning model results in generation of the output through a single execution unit of the machine learning model; and transmit the item listing.

14. The non-transitory machine-readable storage medium of claim 13, wherein the machine learning model is a large language model.

15. The non-transitory machine-readable storage medium of claim 13, wherein the request comprises a uniform resource locator (URL), and wherein the content seed comprises item information retrieved based on the URL.

16. The non-transitory machine-readable storage medium of claim 13, wherein the content seed is at least one of: a PDF, an image, a video, a database record, and/or text.

17. The non-transitory machine-readable storage medium of claim 13, wherein the content seed is retrieved by a first retriever, and wherein the instructions, when executed by the processor, further cause the computing device to:

retrieve a second content seed using a second retriever; and wherein the second content seed is provided as input to the machine learning model at a same time as the content seed.

18. The non-transitory machine-readable storage medium of claim 13, wherein the instructions, when executed by the processor, further cause the computing device to:

search, using a second machine learning model, for item information associated with the requested item listing;

based on the search, retrieve item information from a plurality of item information sources; and wherein the content seed comprises the retrieved item information.

19. The non-transitory machine-readable storage medium of claim 13, wherein the instructions, when executed by the processor, further cause the computing device to:

search, using a second machine learning model, for item information associated with the content seed;

based on the search, retrieve item information from a plurality of item information sources; and modify the content seed to include the retrieved item information.

20. The non-transitory machine-readable storage medium of claim 13, wherein the instructions, when executed by the processor, further cause the computing device to:

process, by a second machine learning model, the content seed, wherein to process the content seed the second machine learning model converts the content seed to an information format accepted as input by the machine learning model.

\* \* \* \* \*